Aug. 18, 1970 E. F. WEISER 3,525,027

REGULATED DYNAMIC BRAKING CIRCUIT

Filed July 29, 1968 12 Sheets-Sheet 1

INVENTOR.
EARNEST F. WEISER

BY Walter C. Bernkopf

HIS ATTORNEY

Aug. 18, 1970 E. F. WEISER 3,525,027

REGULATED DYNAMIC BRAKING CIRCUIT

Filed July 29, 1968 12 Sheets-Sheet 3

REGULATED DYNAMIC BRAKING CIRCUIT

Filed July 29, 1968 12 Sheets-Sheet 6

Aug. 18, 1970 E. F. WEISER 3,525,027

REGULATED DYNAMIC BRAKING CIRCUIT

Filed July 29, 1968 12 Sheets-Sheet 11

United States Patent Office 3,525,027

Patented Aug. 18, 1970

3,525,027

REGULATED DYNAMIC BRAKING CIRCUIT

Earnest F. Weiser, Erie, Pa., assignor to General Electric Company, a corporation of New York Filed July 29, 1968, Ser. No. 748,491
Int. Cl. H02p 3/12
U.S. Cl. 318—367 14 Claims

ABSTRACT OF THE DISCLOSURE

A dynamic braking circuit for series connected D-C motors including a controlled voltage conversion means comprising a phase-controlled impedance in combination with a full-wave rectifier for adding controlled amounts of voltage from a source to the motor and a braking resistance connected in series with the motor armature. The system for controlling the output of the conversion means includes a regulator circuit which, during the intervals of time when the braking resistance is constant in magnitude, controls a voltage level used to vary the firing angle of the phase controlled impedance in accordance with the difference between the instantaneous and programmed or desired braking current and such additional factors as wheel slip. During the mode of operation when the braking effort and hence the flow of current through the motor is to be increased, a first pulse producing circuit is activated when the voltage output of the conversion means exceeds the voltage on the braking resistance. This, in turn, activates a circuit which causes a relay to shunt out a discrete increment of the braking resistance which circuit simultaneously provides an output pulse having a duration equal to the delay in closing of the relay contactor. This output pulse is transmitted to the regulator circuit and to a circuit for providing a variable voltage level to decrease, for a predetermined time after the disappearance of the pulse, the firing angle of the phase controlled impedance and, hence, the output of the conversion means. When the braking effort is to be decreased, a second pulse producing circuit provides a signal when the output of the conversion means is zero, which signal is also transmitted to the aforementioned circuit which this time causes a relay to increase the magnitude of the braking resistance by a discrete increment and which circuit provides a similar output pulse having a duration equal to the delay in the opening of the relay contactor. This pulse is transmitted to the regulator circuit and to a command circuit with the ultimate result that the voltage output of the conversion means is instantaneously increased for a predetermined time and by an amount dependent upon the voltage on the braking resistance.

BACKGROUND OF THE INVENTION

This invention relates to dynamic braking systems for direct-current motors and, more particularly, to a system for regulating the current and hence the braking effort of D-C series field motors connected as generators during the braking mode of operation.

During dynamic braking the D-C motor is connected as a generator and the kinetic energy of a load connected to the motor is dissipated by the resulting flow of current through a braking resistance connected in series with the armature of the motor. Since the braking effort is proportional to the magnitude of the current flowing through the motor and series-connected resistance, the prior art has taught control of the braking effort by a step-by-step increase or decrease in the magnitude of the braking resistance.

Associated with this prior art control method are several deficiencies. In the first place, the smoothness of the braking effort is proportional to the number of steps or increments through which the resistance must be varied. When the motors are traction motors on a railroad or rapid transit vehicle, the braking effort must be smooth so as not to disturb the passengers by jolting the vehicle as a result of sharp increases or decreases in the magnitude of the braking current. For high speed vehicle systems a large number of discrete steps of brake resistance are required and switching through these steps must be accomplished in extremely short time. This imposes prohibitive mechanical requirements on the switching system.

Systems of the type wherein braking control is achieved solely by varying the braking resistance also do not provide maximum permissible current flow and hence maximum braking effort at all speeds. This requires use of an additional braking system in transit vehicles to assist braking at low speeds and to prevent undesired movement of a stopped vehicle. Moreover, such pure resistance switching systems may have a significant time lag in the initiation of braking action which in high speed operation becomes an obstacle to the rapid initiation of braking.

SUMMARY OF THE INVENTION

It is, therefore, an object of this invention to provide a braking system for direct current series motors wherein the braking current and hence the braking effort may be accurately controlled over an adequate range of speed and braking torque.

It is a more particular object of this invention to provide a dynamic braking system wherein smooth braking effort may be obtained by variation of braking resistance through a resistance range by changing braking resistance only through a small number of discrete increments.

It is a further object of this invention to provide a dynamic braking system wherein the maximum permissible level of braking current and hence braking effort may be obtained at any given speed, and wherein braking may be rapidly initiated.

It is another object of this invention to achieve the aforesaid objects with a minimum of costly components, additional to those required for the propulsion system with which the braking system is associated.

Other objects of the invention will be apparent from the following description.

The objects of this invention may be realized by a dynamic braking circuit utilizing a source of controlled D-C voltage for adding controlled amounts of voltage to serially-connected D-C motor means and braking resistance. Means are provided for varying the D-C output of the source in accordance with a desired level or program of predetermined electrical parameters of the motor, such as armature current, and for changing the braking resistance by discrete increments in response to the level of the output voltage. Increases of braking effort are attained by sequentially increasing source output voltage to a desired level and decreasing braking resistance by a discrete increment. In a preferred embodiment the source output voltage increases to a predetermined relationship to the voltage on a discrete increment of braking resistance whereupon the braking resistance is reduced by that increment of resistance. Conversely, braking effort is reduced by sequentially decreasing source output voltage and increasing braking resistance by a discrete increment. In a preferred embodiment the source output voltage is decreased to a predetermined voltage, such as zero volts, whereupon the braking resistance is increased by a discrete increment. Upon a change of braking resistance, the magnitude of the source voltage is rapidly changed opposite the above described directions of change to prevent sudden voltage discontinuities across the remaining braking resistance-motor circuit.

The braking system is adapted for use in electrically powered vehicles and, particularly, A-C powered vehicles wherein a controlled conversion means is utilized to apply propulsion energy to the transit motors. The controlled conversion means, which are adapted for connection to an A-C source and include means such as a phase controlled impedance and rectifier to provide a D-C output of controllable magnitude, provide energy to the motor during braking and propulsion. This obviates the need for a separate power source for the braking system and provides an obvious cost savings. In an alternative arrangement, as each discrete change occurs in the magnitude of the braking resistance, controlled amounts of voltage are successively added from the source to the D-C motor and braking resistance and returned from the motor and resistance to the source.

DETAILED DESCRIPTION

This invention is recited in the appended claims. A more thorough understanding of the advantages and further objects of this invention may be obtained by referring to the following description taken in conjunction with the accompanying drawings wherein:

FIG. 9(*a*) shows a specific embodiment of the pulse generator **55*a*** included in the system of FIG. 3;

Figure 2:
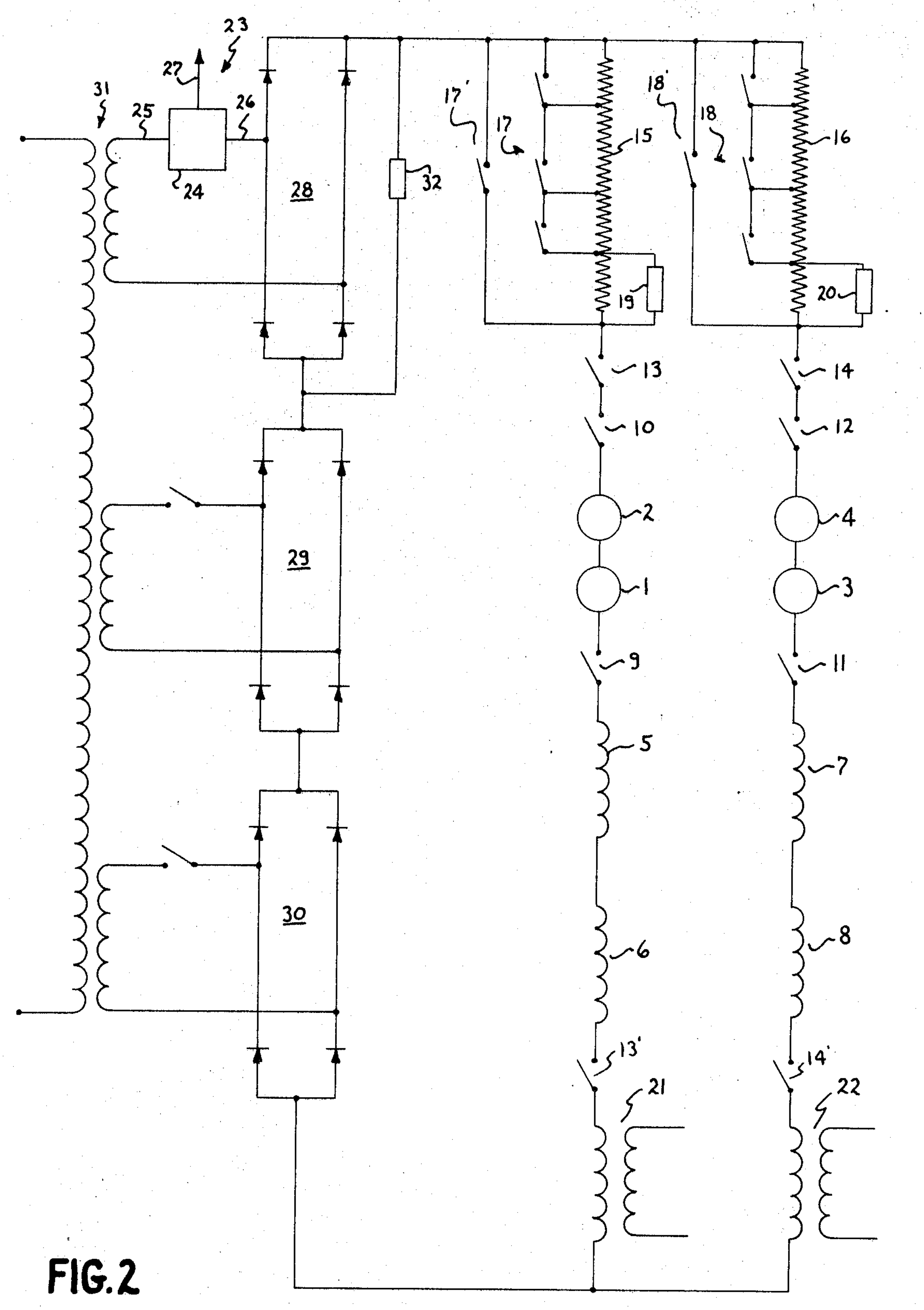
FIG. 2 illustrates a power circuit for D-C series motors to which this invention is applicable.
Figure 3:
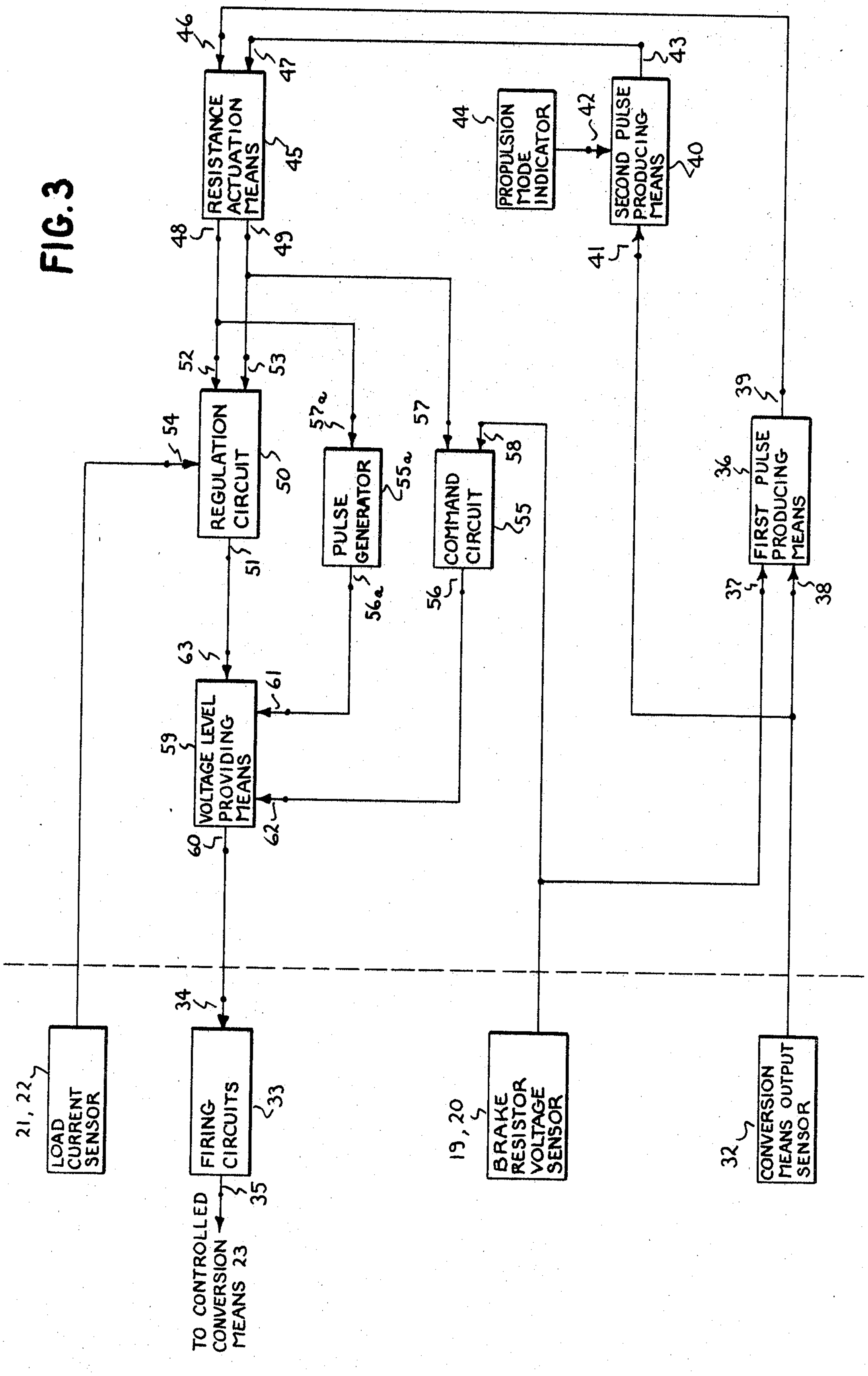
FIG. 3 is a schematic diagram of the control system contemplated by this invention.
Figure 11:
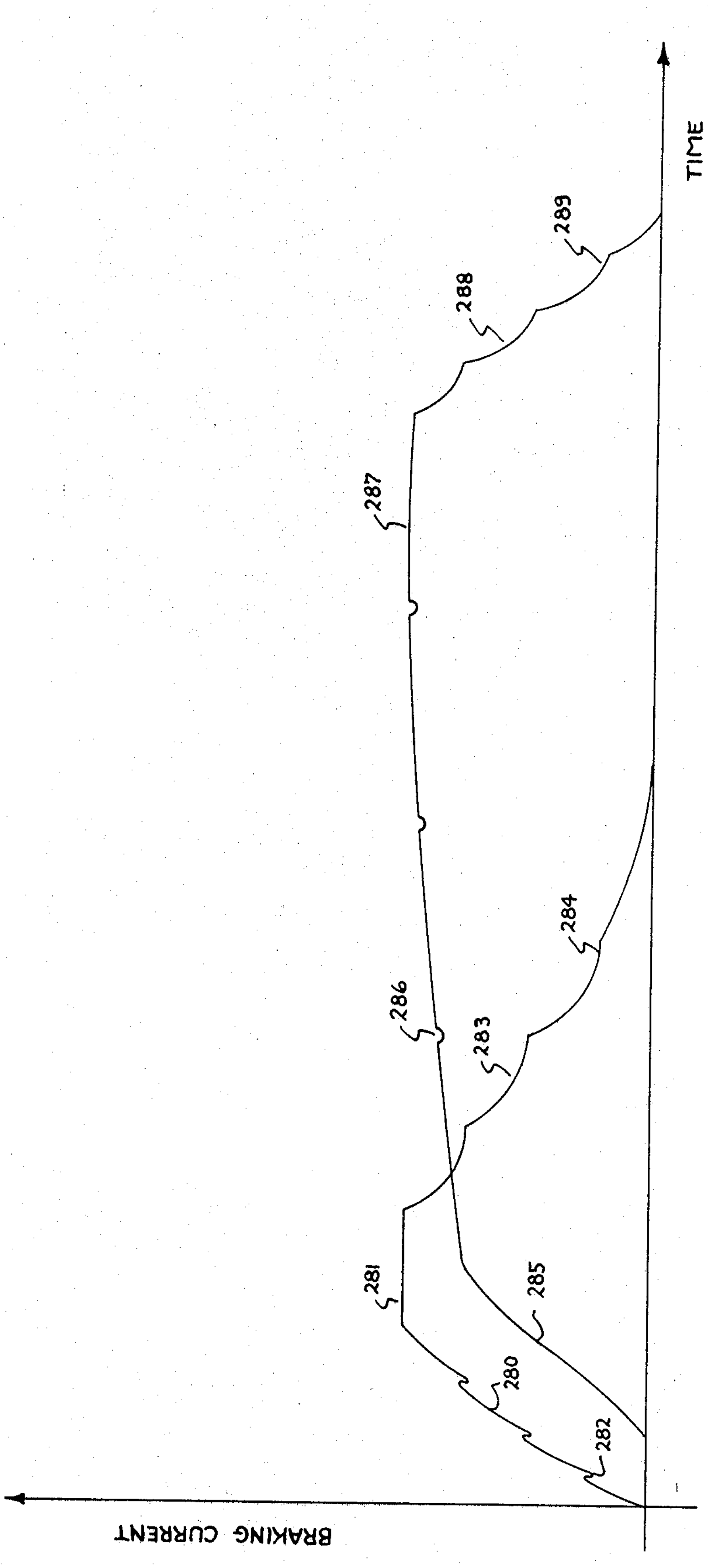
Figure 12:
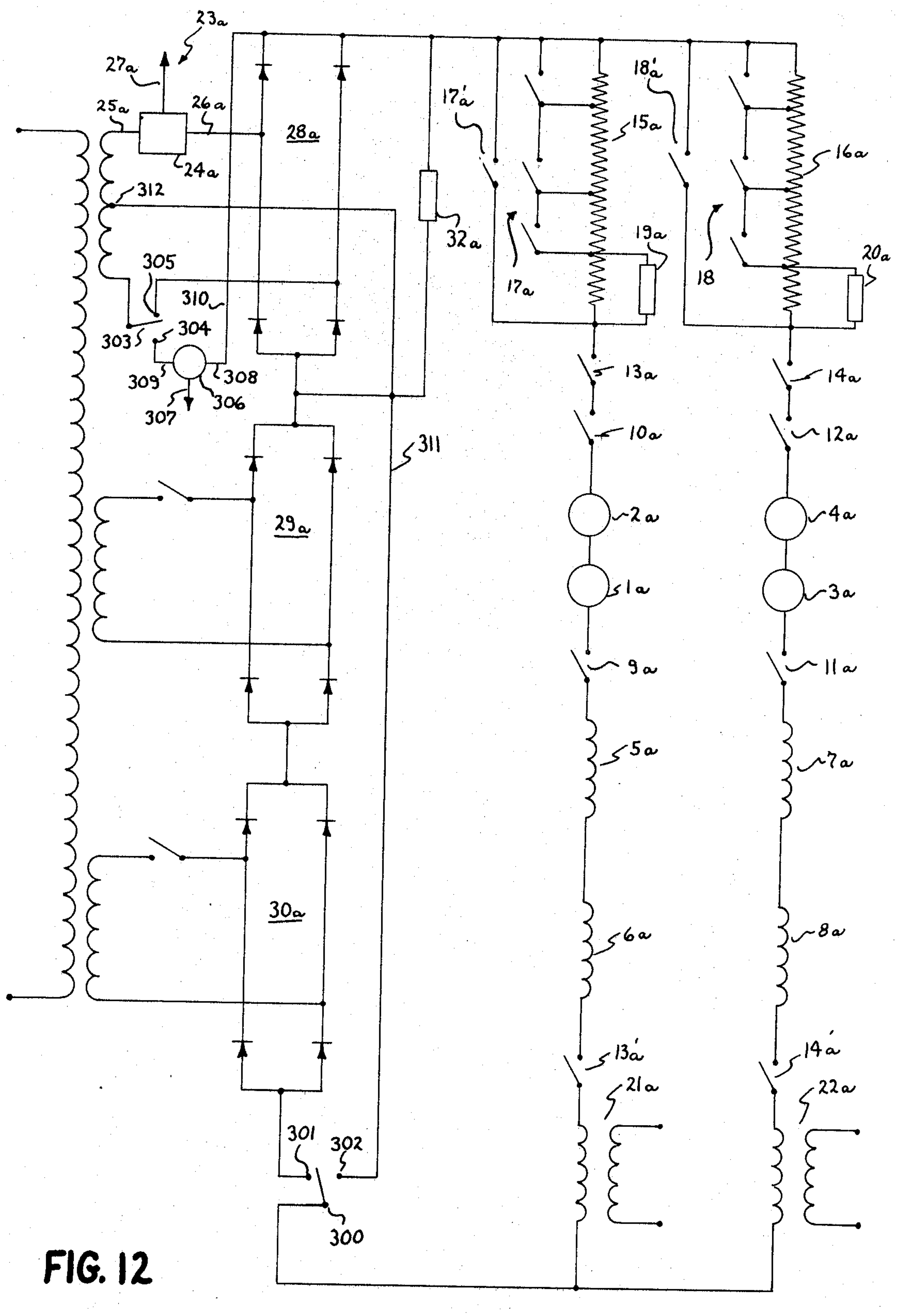
Figure 13:
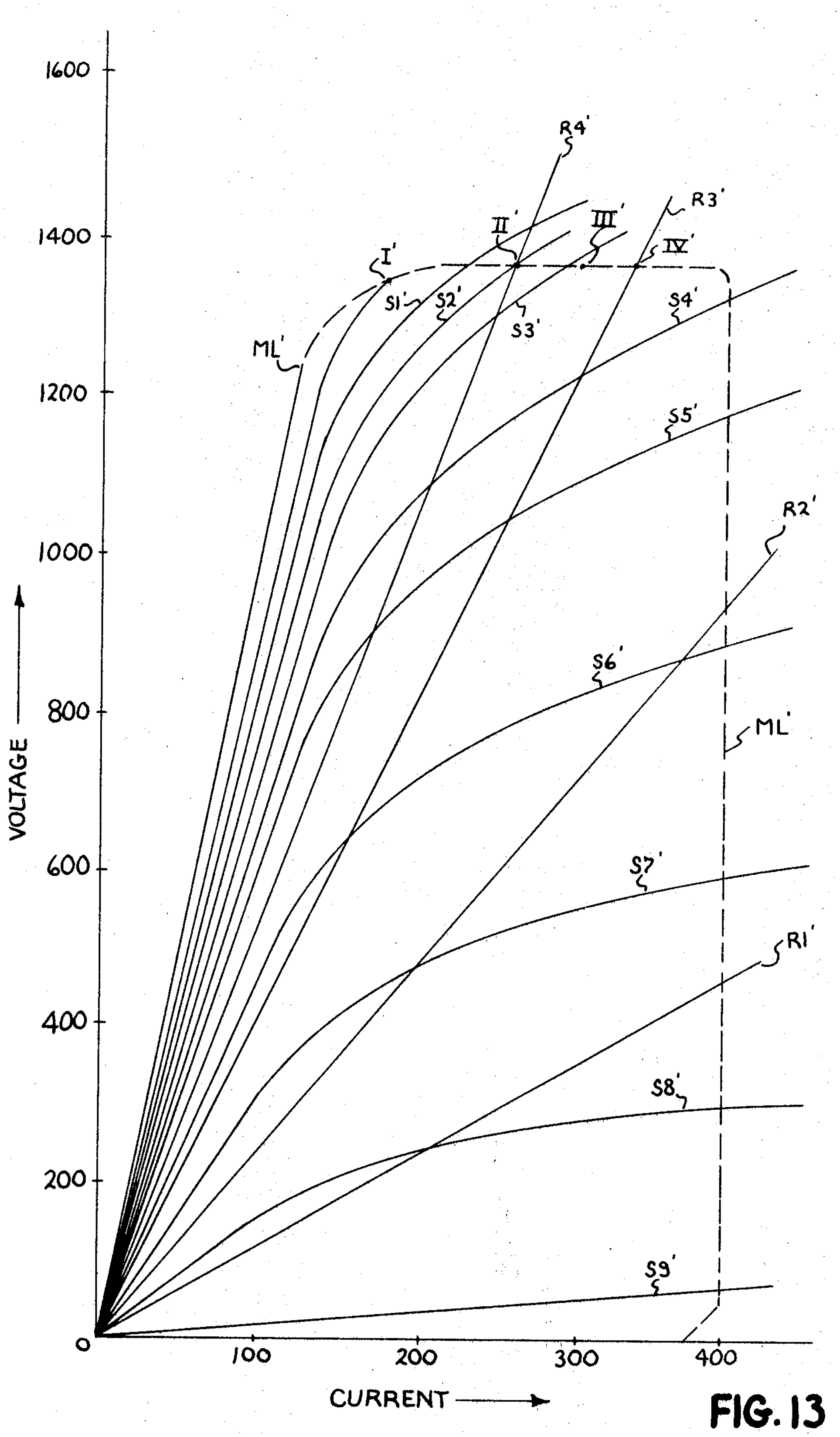

FIG. 11 presents waveforms which show how the system of FIG. 3 regulates the braking current;

FIG. 12 illustrates a modification of the power circuit of FIG. 2 constructed in accordance with an additional aspect of this invention; and FIG. 13 presents waveforms which show how a modification of the system of FIG. 3 regulates the braking current.

In dynamic braking of series field connected D-C motors, the motors are connected as generators and the kinetic energy of the load is dissipated by the resulting flow of current through a braking resistance connected in series with the armature of the motor. In order to control the performance of the load during braking, it is desirable to control this flow of current which determines the braking torque. The current flow has been controlled, conventionally, by varying the magnitude of the braking resistance in small, discrete increments from a maximum value to a minimum value during which variation the magnitude of the current and, hence, the braking torque increases.

Figure 1:
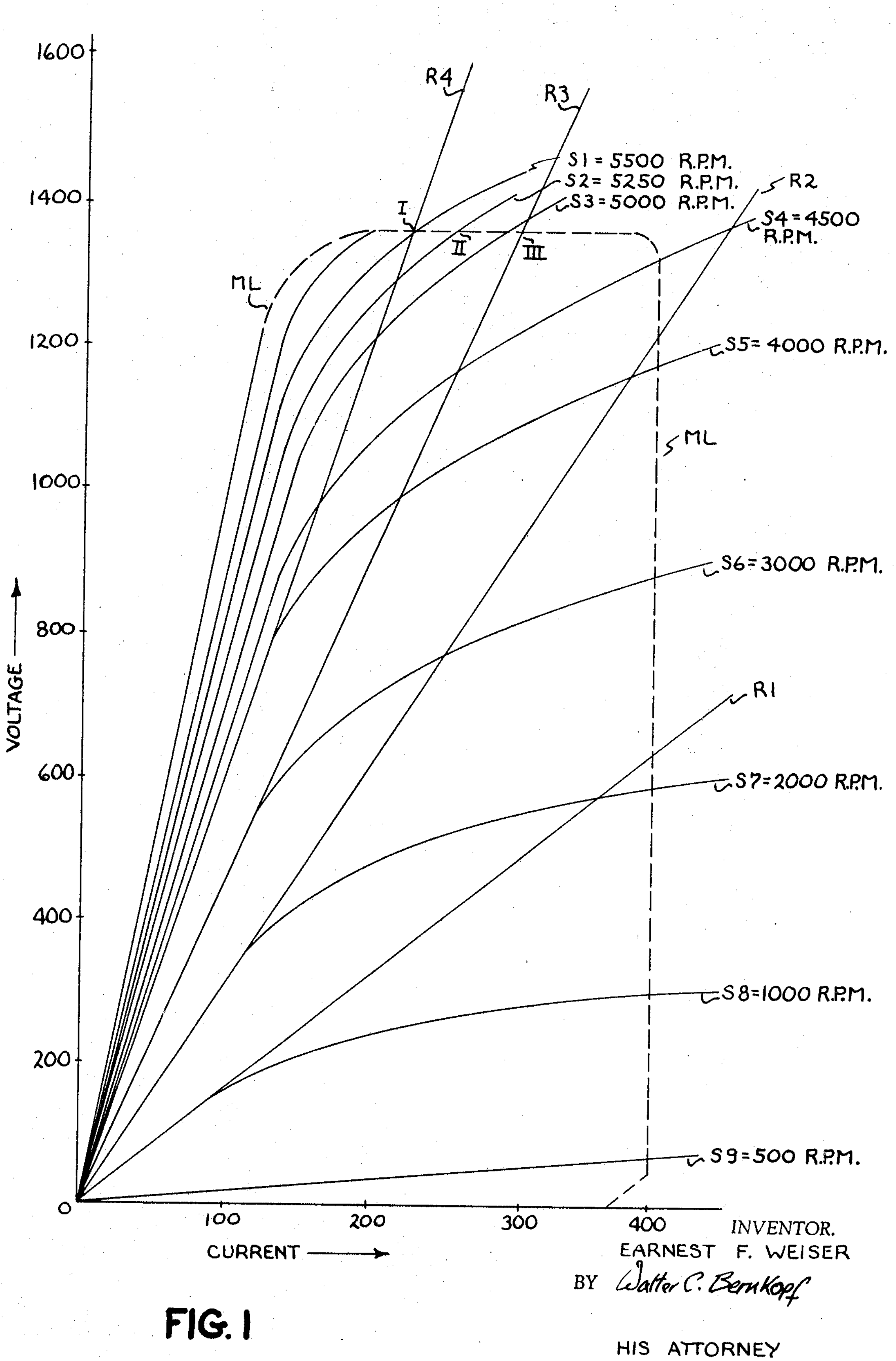
FIG. 1 shows the voltage-current characteristics of a D-C series motor during dynamic braking.

FIG. 1 shows the voltage-current characteristics of a series D-C motor which is connected as a series generator during dynamic braking. Curve ML, which substantially surrounds the characteristics, is known as the motor limits curve and designates the current and voltage limits beyond the motor capability. A plurality of speed curves S1–S9 are shown which are plotted from empirical data. The four straight lines, R4, R3, R2 and R1 are load lines indicating the voltage-current characteristics when four, three, two or one increment of braking resistance, respectively, is included in series with the D-C motor.

Assume, for illustration, that dynamic braking is initiated at a motor speed of 5500 r.p.m. At the beginning of dynamic braking, the entire amount of the braking resistance is included in series with the motor so the operating point will be where the resistor load line R4 intersects the speed curve S1, corresponding to 5500 r.p.m. which is designated I in FIG. 1. At this operating point the motor current is approximately 225 amperes and the voltage across the braking resistance and motor is approximately 1350 volts. As the motor current increases, the speed will decrease. The time desired for the motor speed to be reduced to zero or a significantly lower level will determine the amount of braking effort needed and, hence, the optimum level of braking current. Assume, for this particular illustration, that the desired level of braking current is 300 amperes. From FIG. 1 it is evident that the operating point must be moved to the right in order to attain this desired level of braking current. Moreover, until the desired braking current can be attained, it would be advantageous to maintain the motor current at the maximum possible level for each speed to allow the generation of the maximum possible braking effort. This would require a movement to the right along the motor limit curve ML until the desired current of 300 amperes is obtained.

A movement of the operating point to the right across the characteristics could be obtained by the prior art switching method wherein the magnitude of the braking resistance would be decreased in small discrete increments. It should be noted, however, that in decreasing the braking resistance by discrete increments it would not be possible to move the operating point to the right entirely along the motor limit curve, but, rather, the intersection of the resistor load lines with speed curves would trace a path below the motor limit curve ML. With a given magnitude of braking resistance, the current and voltage are reduced with a movement along the resistance load line as the speed is reduced. When the resistance magnitude is reduced, the current and voltage rise along the speed curve to the intersection of the curve with the resistance load line. Thus, the maximum possible level of braking effort would not be attained in the movement across the characteristics to the desired level of braking current, and, consequently, the operation would be below the maximum possible current which the motor can tolerate at a given speed. This invention, therefore, contemplates apparatus which aids the motors, acting as generators during the braking operation, in maintaining either the maximum flow of braking current possible at any motor speed or in maintaining a prescribed current level. Voltage added in controlled amounts from the source will be used to increase and to maintain the current flow through the motor to the maximum amount of current allowable at the particular speed.

What is proposed, then, is that by means of this invention, it is possible to move to the right along the curve ML to a new operating point designated II in FIG. 1. Moreover, the movement in this range can be achieved without a change in the magnitude of the braking resistance. At this operating point the speed is 5250 r.p.m. and the current is approximately 250 amperes. At this level of current, which is the maximum obtainable for this speed since the speed curve intersects the motor limits curve, the excitation of the generators produces approximately 1350 volts as can be seen in FIG. 1 by projecting the operating point horizontally to the left and reading off the corresponding intersection on the voltage axis. The operation of the system, however, is also governed by the load line R4, and by a vertical translation of the operating point it will be seen that the four resistors which are in the circuit must drop a voltage of approximately 1550 volts. Therefore, to maintain this operating point, an additional 200 volts must be provided to supplement the voltage produced by the excitation of the generators. As contemplated by this invention, this additional voltage will be obtained from the source in a manner similar to that which is done during propulsion.

If more voltage is added from the source and if the braking resistance is maintained constant, it will be seen from FIG. 1 that the operating point will move further to the right along the curve ML. When the operating point designated as III in FIG. 1 is obtained, it will be noted that the load line R3, representing a one increment reduction in the magnitude of the braking resistance, is intersected by the motor limits curve ML. When this point is reached, it will be desirable to reduce the amount of the braking resistance in the circuit by one increment since when the system operates along the R3 load line it will not be necessary to continue adding larger and larger amounts of voltage but rather the amount added from the source can again begin from zero and be gradually increased as operation proceeds further to the right. The magnitude of the braking resistance can be changed by a suitable switching or contactor arrangement. At the instant the resistance is changed, the voltage added from the source must be suddenly reduced to zero magnitude at operating point III. Then by adding additional voltage from the source in controlled amounts the operating point may be moved further to the right until the desired level of 300 amperes current is obtained. When this level is obtained, the control system will prevent any further increases in current and the speed will reduce at this level. When, for example, the motor speed decreases to 4000 r.p.m. at the desired level of current the motors acting as generators will provide a voltage of approximately 1100 volts but the three increments of braking resistance which are now in the circuit must drop a voltage of approximately 1400 volts. This difference is added from the source as contemplated by this invention. With further decreases in speed the point will eventually be reached where the speed curve crosses the load line R2 at which point another increment of braking resistance should be removed leaving only two increments corresponding to the operation of the load line R2 and, simultaneously, the amount of voltage added from the source should be suddently decreased to zero. It should be noted that the particular numerical quantities included in this explanation are intended to be merely exemplary.

The foregoing description has dealt with the mode of operation corresponding to a commanded increase in the braking effort as would occur, for example, when it is desired to bring a rapid transit vehicle to a full stop or to reduce speed when approaching another vehicle. Likewise, it will be necessary to decrease the braking effort during some modes of operation so as to allow the speed of the motors to increase. For example, when a rapid transit vehicle has finished going down a downgrade or has left a congested area it will be necessary to decrease the braking effort to allow the train to pick up speed. Assume, for example, that after braking a speed of 3000 r.p.m. has been achieved at a current level of 300 amperes, a decrease in the braking effort will require a movement to the left across the characteristics of FIG. 1. This, in turn, will require that the amount of voltage added from the source, as contemplated by this invention, be decreased in controlled amounts so that the current and, hence, braking effort will likewise be decreased. With, for example, operation toward the R2 load line a point will be reached at which a particular speed characteristic for a given current intersects the load line R2. At that point it will be desirable to switch in an additional increment of braking resistance because beyond the point of intersection, voltage would have to be subtracted rather than added by the source. At this instant, when operation is suddenly switched to the R3 load line, an amount of voltage must be added from the source corresponding to the difference between the voltage at the intersection of the speed characteristic with the load line R2 and the vertical projection of this point on the load line R3. Thereafter, the amount of voltage added from the source is reduced in controlled amounts so as to reduce the current flow, and, hence, braking effort with a resulting further increase in speed.

POWER CIRCUIT

FIG. 2 shows a power circuit for D-C series motors to which this invention is applicable. In this particular illustration, four D-C traction motors 1–4 are included with motors 1, 2 being series-connected along with their respective fields 5 and 6, and motors 3, 4 being similarly series-connected along with their fields 7 and 8. Suitable contactors 9–12 are connected to the motors, and switches 13, 14 are provided to connect the motors as generators during the braking mode of operation. A braking resistance 15 is connected in series with the motors 1, 2 and, likewise, a braking resistance 16 is connected in series with the motors 3, 4. Connected to the braking resistances 15 and 16 are means 17 and 18, respectively, for varying the magnitude of each resistance in discrete increments. In this particular example, the means 17, 18 each comprise an arrangement of switches or contactors which may be controlled in a manner well known in the art so as to increase or decrease the amount of braking resistance in the circuit merely by shunting or unshunting the various increments of the resistance. Connected across the leg or increment of each braking resistance which during braking always remains in the circuit are voltage measuring reactors 19, 20, the function of which will be evident upon further reading of this specification. Also, current measuring reactors 21, 22 are connected in series with the motors 1, 2 and 3, 4, respectively. The function of the current measuring reactors will also be evident from a further reading of this specification. The switches 17' and 18' are not closed during braking operation and are closed only during certain periods during propulsion.

The power circuit may include one or several branches connected in parallel, each branch comprising one or more series field connected D-C motors and a braking resistance in series therewith. While in a circuit including two branches of motors the braking resistance could be cross-connected from one branch to the other, the parallel arrangement in FIG. 2 has the advantages of lower flashover currents in addition to the possibility of independent braking of the several branches. With the parallel arrangement, a flash current in the motors of one branch will not shunt out current unlimited by resistors connected to the motors in the other branch causing a high surge current as would occur in a cross-connected arrangement.

In accordance with this invention, the power circuit also includes a controlled voltage conversion means 23 comprising a phase controlled impedance 24 having input, output, and control terminals 25, 26 and 27, respectively, and one or more full-wave rectifiers comprising a conventional arrangement of four diodes. The means 23 functions to provide a D-C output voltage of a magnitude controlled by the level of a signal applied to the control terminal. In this particular example, three full-wave rectifiers 28, 29 and 30 are included. The input of the controlled voltage conversion means 23 is connected to a secondary winding of a transformer 31 which is connected to the source of A-C voltage which is the source utilized during the propulsion mode of operation. The phase controlled impedance 24 functions to provide a variable current flow therethrough in accordance with the level of voltage provided at the control terminal 27. The phase controlled impedance could comprise, for example, a bank of ignitron tubes, the igniter terminals of which would be connected to the control terminal 27. The connection of the controlled voltage conversion means 23 to the transformer 31 is actually an adaptation of the connections provided in the propulsion circuit which I have illustrated in U.S. Pat. No. 3,257,597, dated June 21, 1966, and assigned to the assignee of the present invention. Briefly, that patent reveals a system for gradually increasing the D-C voltage in controlled amounts applied to traction motors during propulsion. The transformer, which is connected to a source of A-C voltage, is provided with three secondary windings, each of which is connected to a block, the first of which includes controlled rectifiers combined with a full wave rectifier and the second two of which each include only a rectifier. When the firing angle of the controlled rectifier included within the first block has been advanced to its full value, thereby coupling the maximum possible voltage from the first block to the motors, a second of these blocks is connected in the circuit along with the first while the firing angle of the controlled rectifier in the first block is simultaneously retarded. Thus, the voltage which had been previously supplied by the first block is now supplied by the second. Once again, the firing angle of the controlled rectifier included within the first block is gradually increased to the point at which the two blocks are providing a full value output. The voltage applied to the traction motors is thus successively increased to the point at which all three blocks provide a full value output, if necessary, to enable the motors to operate at full speed.

Likewise, the propulsion circuit may be adapted to operate in the braking mode by utilizing the controlled voltage conversion means 23 to add controlled amounts of voltage to the combination of the motor and braking resistance. It has been found, however, that only one secondary winding need be used, that is the winding connected to the controlled voltage conversion means 23. Broadly speaking the combination of the transformer and rectifier controlled voltage conversion means constitutes a source of adjustable D–C potential which, as contemplated by this invention, aids the series motors, acting as series generators during the braking operation, in maintaining desired electrical parameters of the motors, such as the maximum current flow possible at any motor speed or in maintaining a prescribed current level. Since the braking torque is a function of the current flowing through these motors, programmed braking torques can be maintained while using braking resistances which include a relatively small number of increments.

At the start of braking the switches 13, 13′, 14, 14′ and contactors 9–12 would be closed so as to connect the motors as generators. All of the contactors or switches in the means 17 and 18 would be open so that the maximum amount of braking resistance is in series with each of the motors. A general understanding of the operation of the circuit of FIG. 2 may be best obtained by reconsidering the characteristics of FIG. 1. Braking begins at zero voltage and current and, by virtue of the system contemplated by this invention, there is a rapid, controlled buildup of braking action to the point designated I in FIG. 1. The controlled amounts of voltage added by the means 23 enable an acceleration of the operating point up the resistance load line until a stable point, such as point I is reached. This, in turn, allows the rapid initiation of braking effort. The controlled voltage conversion means 23 will then operate so as to apply larger and larger amounts of voltage to the branch or branches in the circuit so that the braking effort can be increased by moving the operating point to the right along the motor limits curve ML. This gradual increase in voltage is effected, briefly, by controlling the output of the conversion means 23 according to an indication of the motor parameters, such as the instantaneous flow of current, as sensed by the current measuring reactors 21, 22. When operating point III is reached, the control system contemplated by this invention will operate to decrease the magnitude of the braking resistance by one increment. More particularly, an indication of the output of the conversion means 23 is obtained from the voltage measuring reactor 32 and an indication of the voltage on the braking resistance is obtained from each of the voltage measuring reactors 19, 20. In response to a particular relationship between the two voltages, such as that occurring at operating point III, the control system functions to close one of the contactors or switches in each of the means 17, 18 so as to reduce the magnitude of the braking resistance by a discrete increment. At this point the control system also functions to reduce the output of the controlled voltage conversion means 23 to zero. As the system operates to move the operating point from I to III it should be noted that one or all of the various blocks in the supply system may be utilized in a manner similar to that described in the previously mentioned U.S. Pat. 3,257,597. For actual systems presently contemplated, it has been found that only one of the blocks need be used. As the operating point is moved beyond III to further increase the current and hence the braking effort, operation will be on the load line R3 and the output of the controlled voltage conversion means 23 will again be gradually increased from zero to a larger value.

To view the operation of the circuit in FIG. 2 during the mode of operation when a decrease in the braking effort is desired, assume that the motor speed is in the neighborhood of 3000 r.p.m. and that operation is on the load line R2. The output of the controlled voltage conversion means 23 is gradually reduced as a function of a command to reduce the magnitude of the current flowing through the motors in conjunction with an indication of the actual flow provided by the current measuring reactors 21, 22. When the system has moved the operating point to the left at a point where a speed or excitation curve intersects the load line R2, the output of the controlled voltage conversion means 23 will be zero, an indication of which is provided by the voltage measuring reactor 32. This indication is utilized to command the control system to open one of the switches or contactors in the means 17, 18 so that the magnitude of the braking resistance is increased by one discrete increment. The control system simultaneously increases tahe magnitude of the output of the conversion means 23 to provide the necessary additional voltage as determined by the indication provided by the voltage sensing means or reactors 19, 20 connected to the braking resistances. The output of the conversion means 23 is then gradually reduced from this higher value so as to provide a further decrease in motor current and hence braking effort.

It should be noted that the motor limits curve ML in FIG. 1 slopes inwardly at approximately 50 volts so as to extend parallel to the R1 load line. The voltage at which the line slopes inwardly corresponds to the point where the maximum output of the controlled voltage conversion means has been applied. From that point as the speed decreases further, the current also decreases but even at zero speed a significant amount of current does flow. The ability to have current and therefore tractive braking effort at zero speed is another significant advantage of the system contemplated by this invention. Prior art systems do not economically achieve this capability.

CONTROL SYSTEM BLOCK DIAGRAM

The control system contemplated by this invention and which has been summarily discussed, is shown schematically in FIG. 3. The system functions to gradually increase or decrease the output of the controlled voltage conversion means 23 when the braking resistance is constant and to rapidly increase or decrease that output in response to a discrete change in the magnitude of the braking resistance. The measuring components included in the circuit of FIG. 2 are shown in generalized firm to the left of the dotted line in FIG. 3. In particular, there is included a first voltage sensing means corresponding to either of the voltage measuring reactors 19, 20 connected to the braking resistance, a second voltage sensing means corresponds to the voltage measuring reactor 32 connected across the output of the conversion means 23, and a current sensing means corresponding to either of the current measuring reactors 21 or 22. A firing circuit represented by block 33 is also included and is provided with a single input 34 and an output 35 which is connected to the control terminal 27 of the phase controlled impedance 24 shown in FIG. 2. The firing circuit functions, briefly, to provide an output pulse at a time in the cycle of the A-C source determined by the voltage level at the input 34. The firing circuit represented by the block 33 may be constructed in a manner similar to the firing circuits illustrated in the referenced U.S. Pat. No. 3,257,597.

The control system contemplated by this invention includes a first pulse producing means 36 having first and second input terminals 37 and 38, respectively, and a single output terminal 39. The first input terminal 37 is connected to the first voltage sensing means, such as 19, and the second input terminal 38 is connected to the second voltage sensing means 32. The first pulse producing means 36 functions, briefly, to provide an output pulse at terminal 39 in response to the occurrence of a predetermined relationship between the voltages on the input terminals 37 and 38. In this particular example, the relationship is that the voltage at the second input terminal 38, which is proportional to the output of the conversion means 23, is greater than the voltage at the first input terminal 37, which voltage is a function of the voltage on the braking resistance in the power circuit.

The control system includes, in addition, a second pulse producing means 40 having first and second input terminals 41 and 42, respectively, and a single output terminal 43. The first input terminal 41 is connected to the second voltage sensing means 32. The second input terminal 42 is connected to the output of an auxiliary source, propulsion mode indicator 44, which functions, briefly, to provide an output during the propulsion mode of operation, but no output during the braking mode. The need for such an indication to the second pulse producing means is apparent since the only other input, specifically the input at terminal 41, is an indication of the output of the conversion means 23 which will also be operative during the propulsion mode. On the other hand, the inputs to the first pulse producing means 36 include a voltage from the braking resistance which will not exist during the propulsion mode of operation. When the system is incorporated on a railroad or rapid transit vehicle, the source 44 will frequently be located within the propulsion control apparatus. The second pulse producing means 40 will provide an output when the voltage at both input terminals is zero which corresponds to a zero output of the controlled voltage conversion means 23 plus an indication that the system is operating in the braking mode.

The control system contemplated by this invention also includes a resistance actuation means 45 for varying the magnitude of the braking resistance in discrete increments and for providing output signals indicative of such discrete changes. The means 45 is provided with first and second input terminals 46 and 47, respectively, and first and second output terminals 48 and 49. The input terminals 46 and 47 are connected to the output terminals 39 and 43 of the first and second pulse producing means, respectively. The means 45 functions, briefly, to increase or decrease the magnitude of the braking resistance in response to the presence of a pulse at input terminals 46 or 47 and to provide signals at the output terminals 48 or 49 in response to the discrete change in the magnitude of the resistance. More particularly, in response to a pulse at input terminal 46, the means 45 will command the closing of one of the switches or contactors included in the means 17 and 18 shown in FIG. 2 and will simultaneously provide an output pulse at terminal 48 having a duration equal to the delay between the commanded and actual closing of one of the contactors. Likewise, a pulse appearing on input terminal 47 will cause the means 45 to open a switch or contactor included in the means 17 and 18 and to simultaneously provide a pulse at terminal 49, again having a duration equal to the aforementioned time delay. A detailed description of an arrangement similar to the means 45 is included in my copending application Ser. No. 645,747, Motor Control System Using Current Diverter, filed June 13, 1967, and assigned to the assignee of the present invention.

The control system of FIG. 3 also includes a regulation and suppression circuit 50 having a single output terminal 51 and first and second control input terminals 52 and 53 and at least one additional, here a third, input terminal 54. The input terminals 52 and 53 are connected to the output terminals 48 and 49, respectively, of the means 45. The third input terminal 54 is connected to a current sensing means such as load current measuring reactor 21 included in the power circuit. The circuit 50 functions, briefly, to provide an output in accordance with the magnitude of the signal appearing at the third input terminal 54 in the absence of an input at either of the terminals 52 or 53.

When the magnitude of the braking resistance is not undergoing a change, the output of the circuit 50 is utilized to ultimately control the firing angle of the phase controlled impedance 24 included within the conversion means 23. When, however, a previously applied signal falls to zero at either of the terminals 52 or 53, the circuit 50 is bypassed and control is provided by either of two additional arrangements of components. A first is a command circuit 55 having a single output terminal 56 and first and second input terminals 57 and 58. The first input terminal 57 is connected to the output terminal 49 of the means 45. The input terminal 58 is connected to the first voltage sensing means or voltage measuring reactor 19. The command circuit 55 provides an output in response to the presence of a signal at input terminal 57 which output has characteristics determined by the magnitude of the voltage appearing at the input terminal 58.

The other arrangement for bypassing the circuit 50 is a pulse generator 55a having a single output 56a and a single input 57a connected to output terminal 48 of the means 45. This pulse generator is similar to that included within the command circuit 55 as will be evident from a further reading of the specification.

The final component included within the control system contemplated by this invention is a means 59 for providing a variable voltage level which has a single output terminal 60 and first, second and third input terminals 61–63, respectively. Input terminal 61 is connected through the aforementioned pulse generator 55a to the output terminal 48 of the means 45. Input terminal 62 is connected to the output 56 of the command circuit 55 and input terminal 63 is connected to the output terminal 51 of the regulation and suppression circuit 50. The level of the voltage appearing at output terminal 60 is determined by the characteristics of the inputs present on the terminals 61–63. The voltage at terminal 60 is transmitted to the input terminal 34 of the firing circuits 33 which control the firing angle of the phase controlled impedance 24 in accordance with the level of the voltage appearing at input terminal 34.

The operation of the various elements of the control system of FIG. 3 can be best understood by simultaneously considering the characteristics of FIG. 1. Assume that an increase in the braking effort is desired and that the operation of the entire system begins at point I on the characteristics of FIG. 1. In order to move the operating point to the right along the characteristics of FIG. 1 and hence to increase the flow of current and the braking effort, the output of the controlled voltage conversion means 23 should be progressively increased. This, in turn, means that the firing angle of the phase controlled impedance 24 should be increased which can be done by increasing the level of the voltage appearing at input terminal 34 of the firing circuits 33. The regulation and suppression circuit 50 included in the system of FIG. 3 functions to increase the output of the source of adjustable voltage 59 according to programmed levels of current and in accordance with the instantaneous flow of braking current, an indication of which is provided at input terminal 54. Other factors such as wheel slip and a limit on the maximum braking effort can also be programmed into the circuit 50.

During the time when the system operating point is moving to the right from I to III in FIG. 1, the first and second voltage sensing means (the conversion means output sensor and the brake resistor voltage sensor, respectively), are transmitting to the first pulse producing means 36 indications of the voltage output of the conversion means 23 as well as the voltage on the braking resistance. When a point, such as III, is reached at which the output of the conversion means 23 is greater than the voltage on the braking resistance, the pulse producing means 36 will provide an output which is transmitted to input terminal 46 of the means 45. The ultimate result of the appearance of a pulse at input terminal 46 is a decrease in the magnitude of the braking resistance by one increament and a corresponding instantaneous decrease of the output of the conversion means 23 to zero. More particularly, when a pulse appears at input terminal 46, the first result is a command for one of the contactors in each of means 17 and 18 shown in FIG. 2 to close and hence shunt out a portion of the braking resistance. There will be a time delay dependent upon mechanical characteristics of the switching arrangement between the command and the actual closing. The means 45 will simultaneously internally provide a pulse having a duration equal to this time delay, which pulse will appear on output terminal 48. When the contactor has closed and the discrete change in the resistance has occurred, the internally generated pulse will disappear. This output pulse while present will be transmitted both to input terminal 52 of the regulation circuit 50 and to the input terminal 57*a* of the pulse generator 55*a*. While the pulse is present, a pulse system internal to the regulation circuit 50 is armed so that at the conclusion of the pulse control by means of the regulation circuit 50 will be bypassed for a predetermined time, and also at the instant the pulse disappears, the generator 55*a* produces a pulse of a predetermined duration which is applied to input terminal 61 of the source of adjustable voltage 59 which, in turn, provides a reduced or zero voltage level at output terminal 60 with a consequent reduction of the firing angle of the phase controlled impedance 24 to zero. This will occur for a predetermined time delay after which control will be resumed by the regulation and suppression circuit 50 so as to provide further movement to the right along the characteristics beyond operating point III.

The mode of operation corresponding to decreased braking may be examined by assuming that the speed is about 3000 r.p.m., that the current through the motor is at the desired level of 300 amperes, and that operation is on the R2 load line shown in FIG. 1. For the operating point to be moved to the left so that the braking current is reduced, the output of the controlled voltage conversion means 23 must be progressively decreased. This reduction is accomplished by the regulation and suppression circuit 50 in a manner similar to that done to increase the motor current and hence the braking effort. During this time the second voltage sensing means 32 is providing an indication of the output of the controlled voltage conversion means 23 which indication is applied at input terminal 41 of the second pulse producing means 40. When the output of the conversion means 23 reaches zero, the second pulse producing means 40 will provide an output which will be applied at input terminal 47 of the means 45. The ultimate result is that an additional increment of resistance will be switched into the circuit and the output of the controlled voltage conversion means 23 will be instantaneously increased by an amount required by the addition of an increment of braking resistance. More particularly, the means 45 commands one of the contactors in each of the means 17 and 18 shown in the circuit of FIG. 2 to open and a pulse is generated by the means 45 having a duration equal to the time delay between the command and actual closing of the contactor. When this pulse appears at output terminal 49, it is transmitted to input terminal 53 of the regulation circuit 50 and also to input terminal 57 of the command circuit 55. The result is that control by means of the regulation circuit 50 is bypassed during a predetermined time interval, and when the pulse at output terminal 49 disappears, the command circuit 55 functions to provide an output pulse having a magnitude determined by the magnitude of the voltage applied at the input terminal 58, which is an indication of the amount of voltage that must be added by the conversion means 23 as a result of the addition of an increment of braking resistance into the circuit. The output of the command circuit 55 is transmitted to input terminal 62 of the source of adjustable voltage 59, and a significantly higher voltage level appears at output terminal 60 during a predetermined duration so as to sharply increase the firing angle of the phase controlled impedance included within the conversion means 23. After this predetermined duration, control will be resumed by the regulation circuit 50 to progressively decrease the output of the controlled voltage conversion means 23 which results in a further movement to the left along the characteristics of FIG. 1 with a resulting further decrease in braking effort.

The control system contemplated by this invention thus aids the series motors included in the power circuit of FIG. 2, acting as generators during the braking mode, by adding controlled amounts of voltages across each branch including a motor and its respective braking resistance. When, for example, increased braking effort is commanded, the control system gradually increases the amount of voltage added from the source up to a point at which, because of the characteristics of the system, it is desirable to decrease the magnitude of the braking resistance by a discrete increment at which time the control system effects this decrease and instantaneously reduces the amount of added voltage to zero. Then voltage is again added in a gradually increasing amount and a sequence of gradually increasing the amount of added voltage and then instantaneously decreasing it to zero as the braking resistance is simultaneously decreased is repeated until the desired level of braking current and hence braking effort is obtained. By virtue of this control arrangement, during the time between which braking is initiated and a desired braking effort is attained, the maximum braking effort for each particular speed of the motor can be obtained. Likewise, when it is desired to reduce the braking effort as, for example, when a vehicle which is propelled by the motors has left a downgrade or has left a locality through which it was required to proceed at a reduced speed, the system functions to vary the amount of added voltage from a relatively large value to zero in a similar step-by-step fashion in accordance with periodic incremental increases in the braking resistance.

CONTROL SYSTEM COMPONENTS

The operation of the dynamic braking system contemplated by this invention may be more fully understood and the numerous advantages more fully appreciated by an examination of specific embodiment of the various components included within the system of FIG. 3.

FIRST PULSE PRODUCING MEANS

Figure 4:
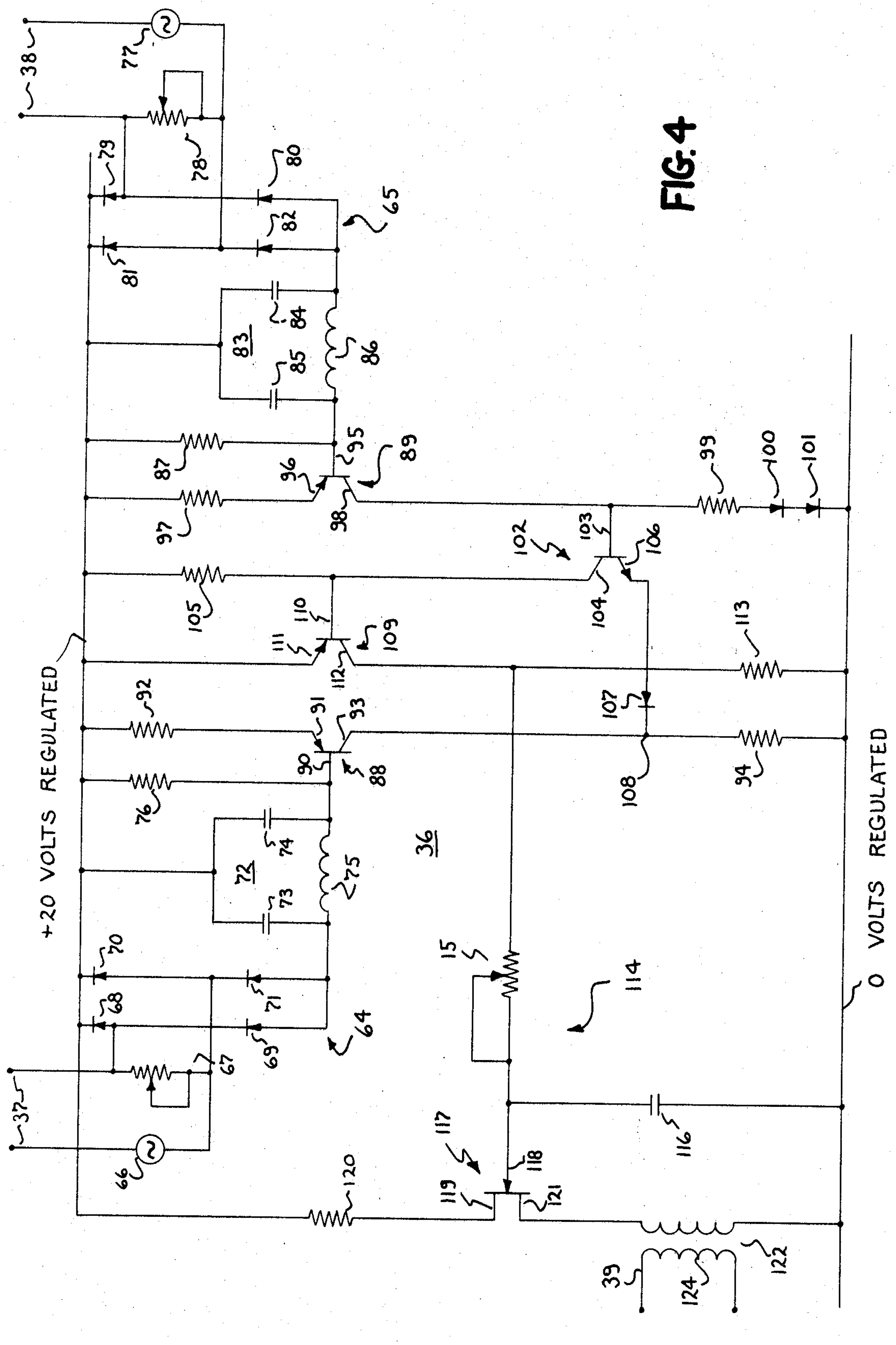
FIG. 4 illustrates a specific embodiment of the first pulse producing means shown in the system of FIG. 3.

FIG. 4 reveals a specific embodiment of the first pulse producing means 36 which includes first and second signal combining means 64 and 65, respectively connected to the first and second inputs 37 and 38, respectively. The two wire inputs 37 and 38 are connected to the two terminal outputs of the first and second voltage sensing means 19, 20 and 32, respectively in the power circuit of FIG. 2. Each of the means 19, 20 and 32 comprises, briefly, a voltage dropping resistor in series with a saturable reactor, and each actually senses the current through the dropping resistor which current is proportional to the voltage. Each of the signal combining means 64, 65 provides an isolated output which is proportional to the measured voltage quantities obtained from the power circuit of FIG. 2. In particular, signal combining means 64 comprises an A-C source 66 connected to input terminal 37, an adjustable resistor 67 connected across input terminal 37 and, the source 66, a full-wave rectifier comprising diodes 68–71 which rectifier is connected across resistor 67, and a filter 72 comprising capacitors 73 and 74 and an inductor 75. The filter 72, which is connected to the rectifier, removes the carrier frequency added by the A-C source 66, and the output voltage which appears across a resistor 76 is an isolated voltage which is proportional to the D-C voltage which appears on the braking resistance in the power circuit of FIG. 2. Similarly, the second signal combining means 65, which is of the same circuitry as the first signal combining means, includes an A-C source 77 connected to input terminal 38, a variable resistor 78 connected across the A-C source and input terminal 38, four diodes 79–82 connected as a full-wave rectifier, and a filter 83 comprising capacitors 84 and 85 and an inductor 86. The output voltage appearing on resistor 87 is an isolated voltage proportional to the D-C voltage appearing across the controlled voltage conversion means 23 of the circuit of FIG. 2. For both the signal combining means 64 and 65 a suitable frequency for the A-C sources 66, 77 was found to be 800 cps.

The pulse producer also includes first and second semiconductor switches comprising PNP transistors 88 and 89, respectively, each having a control terminal connected to the output of the first and second signal combining means 64 and 65, respectively. In particular, base terminal 90 of transistor 88 is connected to resistor 76, emitter 91 is connected through a resistor 92 to a bias voltage line, in this example 20 volts regulated, and the collector 93 is connected through a resistor 94 to another bias voltage line, in this particular example, zero volts regulated. Similarly, base terminal 95 of transistor 89 is connected to resistor 87, the emitter 96 is connected through a resistor 97 to the 20 volt bias line and the collector 98 is connected through resistor 99 and diodes 100, 101 to the zero volt bias line. The series-connected resistor 99 and diodes 100, 101 comprise a temperature compensating network as will be subsequently explained. The conduction of each of the transistors 88, 89 will be determined by the level of the voltage appearing at the control or base terminals 90, 95, respectively, which level, in turn, will be proportional to the magnitude of the direct voltages appearing on the braking resistance and the controlled voltage conversion means, respectively, in the power circuit of FIG. 2.

A third semiconductor switch comprising NPN transistor 102 is also included, and is connected to the second semiconductor switch or transistor 89 in a manner such that the level of voltage appearing at the control terminal of the transistor 102 is a function of the conduction of the second semiconductor switch 89. In particular, base terminal 103 of transistor 102 is connected directly to the collector 98 of transistor 89, and the collector terminal 104 is connected through a resistor 105 to the 20 volt bias line. A unidirectional current conducting means is connected between the first semiconductor switch and the third semiconductor switch. More particularly, the emitter 106 is connected through a diode 107 to a point 108 between the resistor 94 and the collector 93 of transistor 88. The base terminal 103 is also connected to the series combination of resistor 99 and diodes 100 and 101 which combination serves as a temperature compensating network for the transistor 102 and diode 107.

A fourth semiconductor switch comprising PNP transistor 109 is connected in the pulse producer circuit so that the voltage appearing at the control terminal of the switch is a function of the conduction of the third semiconductor switch. In particular, the base terminal 110 of transistor 109 is connected to the collector terminal 104 of transistor 102 and also to the 20 volt bias line through resistor 105. The emitter 111 of the transistor is connected directly to the 20 volt bias line and the collector 112 is connected through a resistor 113 to the zero volt bias line.

The pulse producing means 36 finally includes an energy storage network 114 comprising a variable resistor 115 and a capacitor 116 which network is in combination with a semiconductor pulse producing means comprising unijunction transistor 117. The energy storage network is connected to the fourth semiconductor switch or transistor 109 so as to accumulate energy when the transistor is conducting. Specifically, the collector 112 of transistor 109 is connected to one terminal of variable resistor 115, the other terminal of which is connected to a terminal of the capacitor 116. The other terminal of the capacitor is connected to the zero volt bias line. The semiconductor pulse producing means, or unijunction transistor 117 is connected so as to provide an output pulse when the level of energy stored in the network 114 reaches a predetermined level. The emitter 118 of the unijunction transistor is connected to the capacitor 116 and the resistor 115. A first base terminal 119 is connected through a resistor 120 to the 20 volt bias line, and a second base terminal 121 is connected through an input winding of an isolation transformer 122 to the zero volt bias line. The output terminal 39 of the pulse producing means 36 is connected to an output winding of the isolation transformer.

The pulse producing means 36 shown in FIG. 4 will be periodically activated to provide an output pulse at terminal 39 when the control system operates to increase the braking effort. The voltage measured from the braking resistance is applied by voltage measuring reactor 19 or 20 at input terminal 37 and the voltage measured across the output of the controlled voltage conversion means is applied by voltage measuring reactor 32 to input terminal 38. The voltages appearing on resistors 76 and 87 in the circuit of FIG. 4 will be isolated voltages proportional to the voltages on the braking resistance and across the output of the controlled voltage conversion means, respectively, in the power circuit. Upon conduction of the transistors 88 and 89, the voltage at point 108 will be proportional to the voltage on the braking resistance and the voltage at the base terminal 103 of transistor 102 will be proportional to the voltage output of the controlled voltage conversion means. When the latter is greater than the voltage at point 108, the transistor 102 will conduct with the result that the voltage at the base terminal 110 of ransistor 109 will be lowered causing that transistor to conduct. A flow of current will then result through transistor 109 to the energy storage network 114 causing a voltage to be built up on capacitor 116. When the voltage across the capacitor 116 reaches a level sufficient to fire unijunction transistor 117, as determined by the magnitude of the bias resistor 120, a pulse will appear at output terminal 39. Thus, the circuit of FIG. 4 functions to provide an output pulse when the measured voltage at the output of the controlled voltage conversion means is greater than the measured voltage on the braking resistance in the power circuit. In addition, the controlled voltage conversion means output must be greater than the voltage on the braking resistance for a time determined by the time constant of the energy storage network 114. This condition avoids the undesirable generation of an output pulse in response to a momentary surge in the output of the conversion means, and it has been found that in many applications a time of one-tenth of a second is sufficient. The pulse appearing at terminal 39 is transmitted to the input terminal 46 of the means 45 shown in FIG. 3 to initiate a discrete decrease in the magnitude of the braking resistance.

SECOND PULSE PRODUCING MEANS

Figure 5:
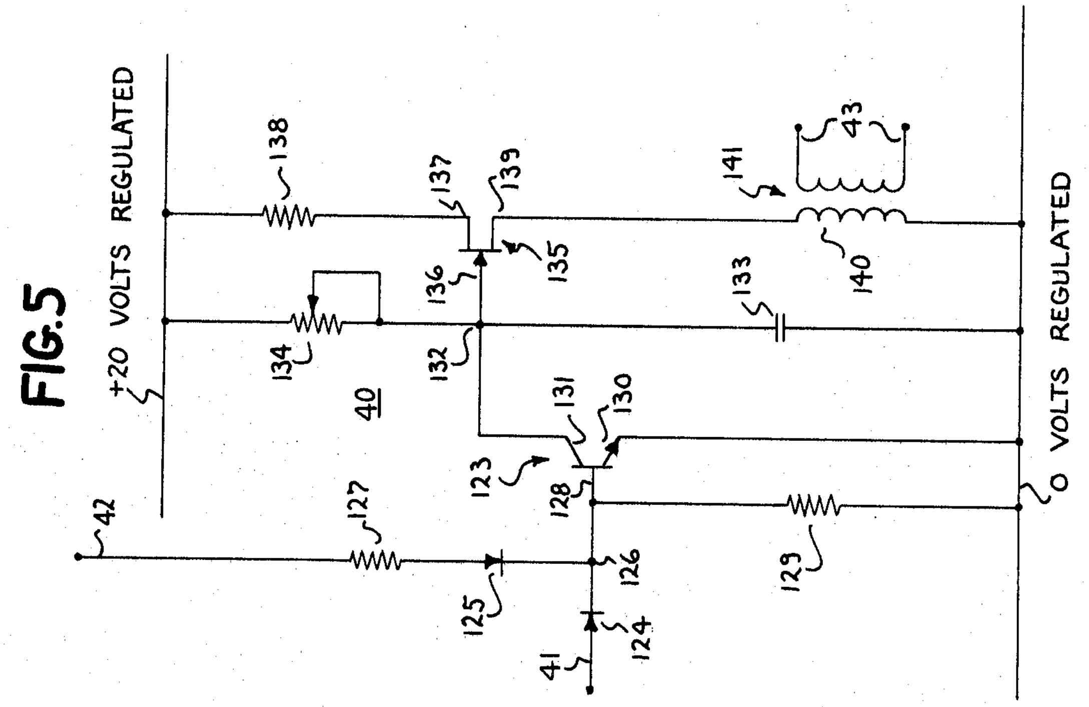
FIG. 5 shows a specific embodiment of the second pulse producing means included within the system of FIG. 3.

FIG. 5 reveals a specific embodiment of the second pulse producing means 40 included within the control system of FIG. 3. It includes a semiconductor switch comprising NPN transistor 123 having a control terminal connected to first and second unidirectional current conducting means or diodes 124, 125. The cathodes of the diodes are joined together at a common point 126 and the anode of diode 124 is connected to input terminal 41. The anode of diode 125 is connected through a resistor 127 to input terminal 42. The control or base terminal 128 of transistor 123 is also connected through a resistor 129 to the zero voltage bias line. The emitter 130 of transistor 123 is connected directly to this bias line and the collector 131 is connected at point 132 to an energy storage network comprising capacitor 133 and adjustable resistor 134. The resistor and capacitor are connected in series between the two bias voltage lines. The point 132 at which the collector 131 of transistor 123 is connected to the energy storage network is also connected to a semiconductor pulse producing means comprising unijunction transistor 135. The emitter 136 of the unijunction transistor is connected to point 132, base terminal 137 is connected through a resistor 138 to the 20 volt bias line, and base terminal 139 is connected to the input winding 140 of an isolation transformer 141, the output winding of which is connected to output terminal 43.

When the transistor 123 is conducting, a discharge path is provided for the capacitor 133 so that the voltage at point 132 will not reach the level necessary for firing the unijunction transistor 135. The transistor 123 will remain conducting, in turn, as long as a positive voltage is applied at either of the input terminals 41, 42 of a magnitude sufficient to forward bias either of the diodes 124, 125. The voltage appearing at input terminal 41 may be supplied by conversion means output sensor 32 and is indicative of the magnitude of the output voltage of the controlled voltage conversion means. A voltage appearing at input terminal 42 may be provided by the propulsion mode indicator 44 and is indicative of the motors operating in the propulsion, rather than braking mode. When, however, the voltage at the anodes of both the diodes 124, 125 is zero, that is, when the conversion means output is zero and when the motors are operating in the braking mode, the diodes will both be reverse biased, transistor 123 will be turned off allowing energy to accumulate in the storage network and, after a delay determined by the magnitudes of resistor 134 and capacitor 133, unijunction transistor 135 will fire and provide an output pulse on terminal 43. Thus, when the output of the controlled voltage conversion means is zero for a predetermined time and, when the system is operating in the braking mode, the second pulse producing means will provide an output. This output pulse is transmitted to the second input terminal 47 of the means 45 shown in FIG. 3 and will initiate a discrete increase in the magnitude of the braking resistance.

RESISTANCE ACTUATION MEANS

Figure 6:
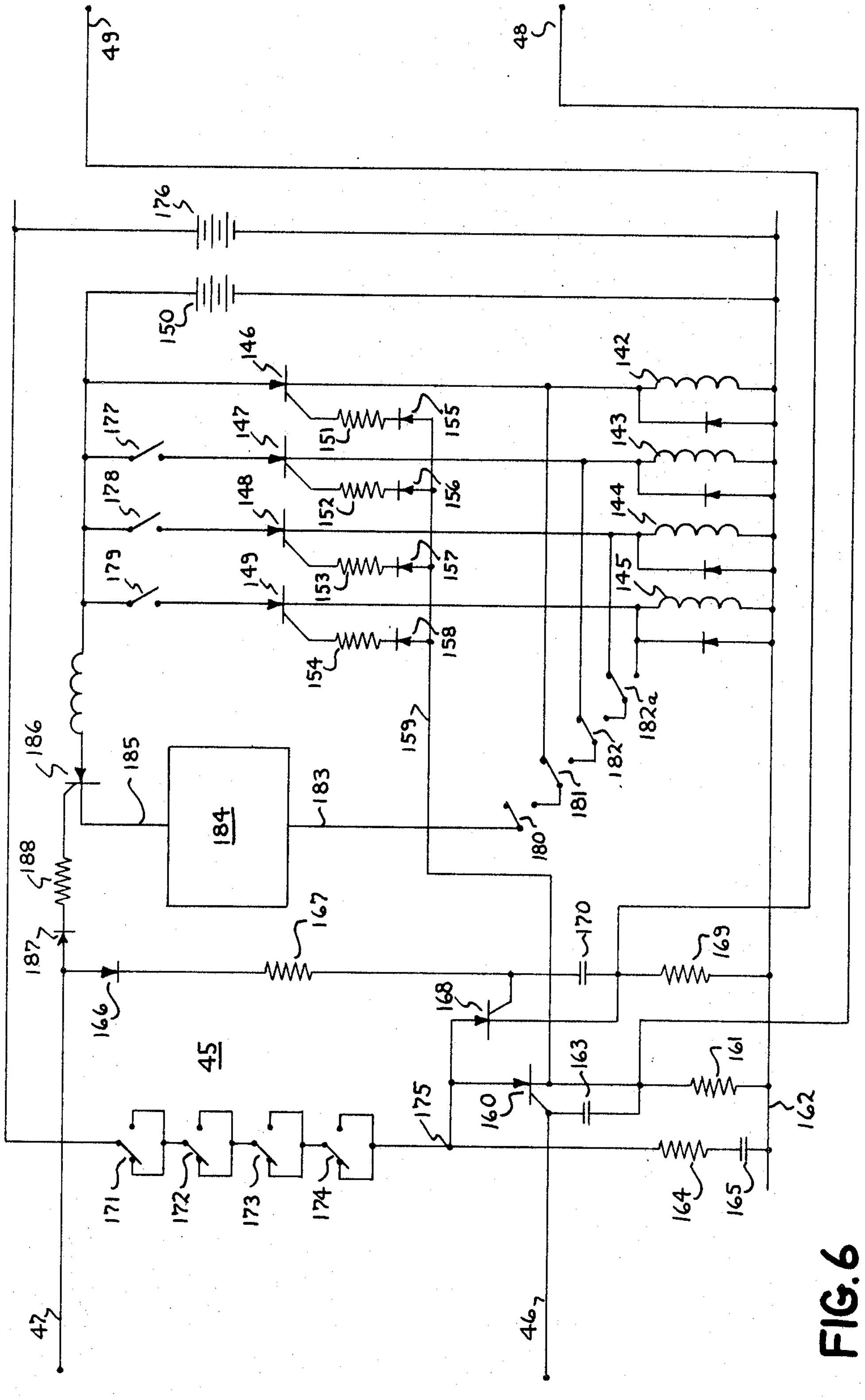
FIG. 6 illustrates an embodiment of the means in the system of FIG. 3 for varying the magnitude of the braking resistance in discrete increments and for providing an indication of such a change.

FIG. 6 illustrates a specific embodiment of the means 45 for changing the magnitude of the braking resistance in discrete increments and for providing an indication of the change. An arrangement similar to the means 45 illustrated in FIG. 6 is disclosed in my copending application Ser. No. 645,747, filed June 13, 1967, entitled, "Motor Control System Using Current Diverter," and assigned to the assignee of the present invention. Each of the switches or contactors associated with the means 17 and 18 as shown in the power circuit of FIG. 2 has associated therewith a relay coil and, in this particular example, four coils 142–145 are shown in FIG. 6. Controlled rectifiers 146–149 are connected in series with the coils 132–145, respectively, so that the coils may be energized from a source of voltage 150. Connected to each gate or control electrode of the controlled rectifiers are resistors 151–154 and diodes 155–158, respectively. The anodes of the diodes 155–158 are joined together by a line 159 over which gating pulses for the controlled rectifiers 146–149 are transmitted. Line 159 is connected to the cathode electrode of a controlled recitfier 160 which, when conducting, allows pulses to be sent over the line 159 and to the output terminal 48 of the means 45. The cathode of controlled rectifier 160 is also connected through a resistor 161 to a source of bias voltage 162, and a capacitor 163 is connected from the gate to the cathode of the controlled rectifier. The anode of the controlled rectifier is connected through resistor 164 and capacitor 165 to the bias line 162. The input terminal 47 of the means 45 is connected through a diode 166 and a resistor 167 to the gate or control terminal of a controlled rectifier 168, the anode of which is joined to the anode of the companion controlled rectifier 160 and the cathode of which is connected through a resistor 169 to the source of bias 162. Output terminal 49 is connected to the cathode of device 168 whereby pulses are supplied to terminal 49 upon conduction of device 168. A capacitor 170 is connected between the gate and cathode of device 168, and resistor 169 is connected from the cathode to bias line 162.

Each of the contactors shown in FIG. 2 which are energized by the relay coils 142–145 shown in FIG. 6 is provided with three interlock fingers. A first set of the fingers 171–174 is shown in FIG. 6 arranged in a series bank and connected from the voltage source 176 to a point 175 common to the anodes of the controlled rectifiers 160, 168. A movement of any of the fingers from one contact point to the other will cause a momentary de-energization and commutation of the controlled rectifiers 160, 168. The movement of a power circuit contactor in response to the energization of relay coil 142 would, for example, cause interlock finger 171 to move from the position shown in FIG. 6 to the right hand contact point. A second set of interlock fingers comprises three switches 177–179 connected to the anodes of the controlled rectifiers 147–149, respectively. These switches function, briefly, to close upon the energization of the preceding controlled rectifier and relay coil combination. More particularly, the movement of a power circuit contactor in response to the energization of relay coil 142 as a result of the turning on of controlled rectifier 146 will close switch 177 so that controlled rectifier 147 is properly biased and will be rendered conducting upon the appearance of a pulse at its gate terminal. A third set of interlock fingers is shown in FIG. 6 as the switches **180–182*a*, the function of which, briefly, is to allow the successive application of a commutating pulse respectively, to controlled rectifiers 146–149. Commutation of the controlled rectifiers results in deenergization of corresponding ones of the coils 142–145 which, in turn, results in the opening of a contactor in the circuit of FIG. 2. The first switch 180 is connected to the output 183 of a pulse generator 184, the input 185 of which is connected to the cathode of a controlled rectifier 186. The anode of the controlled rectifier is connected through a coil 187 to the source of voltage 150 which provides a bias for the controlled rectifiers 146–149. The input terminal 47 of the means 45 is connected through a diode 187 and a resistor 188** to the gate terminal of this controlled rectifier.

When the entire control system shown in FIG. 3 is operating to increase the braking effort and, hence, the flow of current through the motors, a point will be reached such as that designated as III on the characteristics of FIG. 1 at which point the output of the conversion means 23 will exceed the voltage on the braking resistance and the first pulse producing means 36 will be activated so as to apply a pulse at input terminal 46 of the circuit shown in FIG. 6. This causes the conduction of controlled rectifier 160, and a pulse will be transmitted by line 159 through diode 155 and resistor 151 to the gate terminal of controlled rectifier 146 causing it to conduct so that current flows through relay coil 142 to close one contactor in each of the branches shown in the circuit of FIG. 2. Upon the initial movement of the contactor, the three interlock fingers 171, 177 and 180 will also move with the result that switch 177 is closed, switch arm 180 moves to the lower contact point, and switch arm 171 moves to momentarily deenergize and commutate controlled rectifier 160. When the contactor in the circuit of FIG. 2 has closed, switch arm 171 will have moved to the right-hand position so as to reapply the voltage from source 176 to the anode of controlled rectifier 160. As the entire system functions to further increase the braking effort, a second operating point will be reached at which the first pulse producing means 36 of FIG. 3 is again activated so as to apply a pulse at input terminal 46 which, again, results in energization of line 159 but this time to gate the controlled rectifier 147. Current will flow through the coil 143 so as to close a second contactor in the power circuit and, simultaneously, switch arm 178 will cloes and one of the other interlock fingers, such as 172, will commutate controlled rectifier 160 and then renergize the anode of that rectifier. Thus, as a series of pulses are applied at input terminal 46 the contactors shown in FIG. 2 will be sequentially closed and a series of pulses will appear at output terminal 48 having a duration equal to the delay between the commanded closing and the actual closing of the contactors in the power circuit.

To understand the operation of the circuit of FIG. 6 when the braking effort is reduced, assume that all of the increments of braking resistance have been shunted and, therefore, that all the contactors in the circuit of FIG. 2 have been closed. The three switch arms 177–179 will be closed and the switch arms **180–182*a* will all be in contact with the bottom points. The control system of FIG. 3 will operate to reduce the output of the controlled voltage conversion means 23 gradually to the point where its magnitude is zero at which point the second pulse producing means 40 will be activated so as to apply a pulse at input terminal 47. This pulse is transmitted through the diode 187 and resistor 188 to the gate terminal of controlled rectifier 186 causing the voltage of source 150 to apply a charge to the pulse generator 184. The pulse is simultaneously transmitted through diode 166 and resistor 167 to the gate terminal of controlled rectifier 168. The pulse generator 184 will provide an output after a predetermined charging time which is transmitted through the contacts 180–182*a* so that a commutating potential is applied to controlled rectifier 149 to deactivate coil 145 and thus open the contactor associated therewith. The movement of this contactor results in the switch arm 174 momentarily breaking contact so as to commutate and then reenergize the anode of controlled rectifier 168. The pulse transmitted through diode 166 and resistor 167 having turned on controlled rectifier 168, the flow of current therethrough to the resistor 169 establishes a potential thereon which is applied to output terminal 49. When the contactor has fully opened, the switch arm 174 will move to the left-hand position shown in FIG. 6 with the result that controlled rectifier 168 is turned off and the voltage at output terminal 49 disappears. As the output of the controlled voltage conversion means 23 is again reduced to zero a similar sequence of operations will occur resulting in the opening of the remaining contactors of the circuit of FIG. 2 through the commutation of the remaining controlled rectifiers 148, 147 and 146**, respectively.

VOLTAGE LEVEL PROVIDING MEANS

Figure 7:
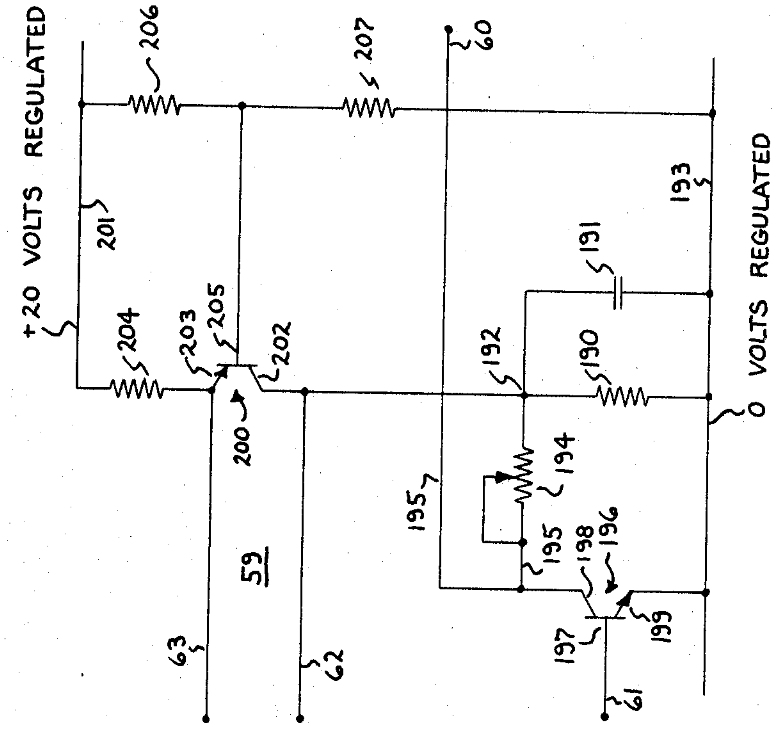
FIG. 7 shows a specific embodiment of the means for providing a variable voltage level included in the system of FIG. 3.

FIG. 7 reveals a specific embodiment of the voltage level providing means 59 included within the system of FIG. 3. A filter comprising resistor 190 and capacitor 191 is connected between a common point 192 and a bias voltage line 193. Point 192 is connected through a variable resistance 194 and line 195 to output terminal 60. The voltage level appearing at this output terminal is utilized to control the firing angle of the phase controlled impedance 24 included within the controlled voltage conversion means 23. A semiconductor switch comprising NPN transistor 196 is connected to the output terminal 60 and has a control terminal connected to the first input terminal 61. In particular, the base terminal 197 of transistor 196 is connected to input terminal 61, the collector terminal 198 is connected to line 195, and the emitter terminal 199 is connected to the bias voltage line 193. The second input terminal 62 of the means 59 is connected to point 192 at which the resistor 190 and capacitor 191 comprising the filter 189 are joined. A second semiconductor switch comprising PNP transistor 200 is connected between a positive bias voltage line 201 and the second input terminal 62 as well as the third input terminal 63. Specifically, the collector 202 of transistor 200 is connected to the input terminal 62 and to the point 192, the emitter terminal 203 is connected through a resistor 204 to the bias voltage line 201 and also directly to the third input terminal 63, and the base terminal 205 is connected to the junction of a voltage divider comprising resistors 206, 207 connected across the bias lines 201 and 193.

In operation, the level of voltage established at point 192 which may also be designated the pedestal height, is utilized to ultimately control the firing angle of the phase controlled impedances within the conversion means 23 and hence the magnitude of the output thereof. Thus, as the voltage at point 192 rises, the pedestal height will be increased resulting in a larger firing angle; a smaller firing angle results from a decreased pedestal height. The voltage at point 192 is determined, in the absence of a signal appearing at input terminals 61, 62 by the amount of current flowing through transistor 200. This current can be controlled by bleeding off a portion thereof by means of the connection from the emitter 203 to input terminal 63. This input terminal is connected to the regulator means 50 shown in FIG. 3, the function of which is to bleed off more or less current depending upon the desired pedestal height. The regulator means will be described in more detail subsequently in the specification. Thus, when a larger output of the conversion means 23 is desired, less current should be bled off from the transistor 200 so as to increase the flow of current therethrough and increase the voltage buildup on the filter comprising components 190 and 191. Similarly, when a lower output of the conversion means 23 is desired, more current is bled from transistor 200 so as to result in a lower level of voltage established on the filter 189.

Input terminal 61 is connected to the output terminal **56*a* of the pulse generator 55*a* shown in FIG. 3, and a pulse will appear on this terminal at a time corresponding to the instant at which the output of the controlled voltage conversion means should be decreased to zero. More specifically, a pulse will appear at input terminal 61 for a predetermined time after a contactor in the circuit of FIG. 2 has closed and this pulse renders transistor 196 conducting so as to decrease to zero the voltage level on line 195 and, hence, at output terminal 60. More particularly, during the time transistor 196 is conducting, capacitor 191 is discharged through the adjustable resistor 194 so as to reduce the voltage level on the capacitor to zero or a suitably low value. A zero output at terminal 60 will ultimately result in the turning off of the phase controlled impedances within the controlled voltage conversion means. When the pulse at input terminal 61 disappears, transistor 196 will no longer be conducting and the voltage at output terminal 60 will again be determined by the voltage on the filter comprising components 190 and 191 which, in turn, is controlled by the amount of current flowing through the transistor 200. Input terminal 62 is connected to output terminal 56 of the command circuit 55 shown in FIG. 3, which will be described more completely further on in the specification. A voltage level is applied to input terminal 62 when the magnitude of the braking resistance is increased by a discrete increment at which time it is necessary to also suddenly increase the output of the controlled voltage conversion means. The amount of the increase is controlled by the command circuit 55. When this voltage level is removed from input terminal 62, the voltage at output terminal 60 will again be determined by the voltage appearing on the filter 189 which is determined by the amount of current flowing through the transistor 200**.

REGULATION CIRCUIT

Figure 8:
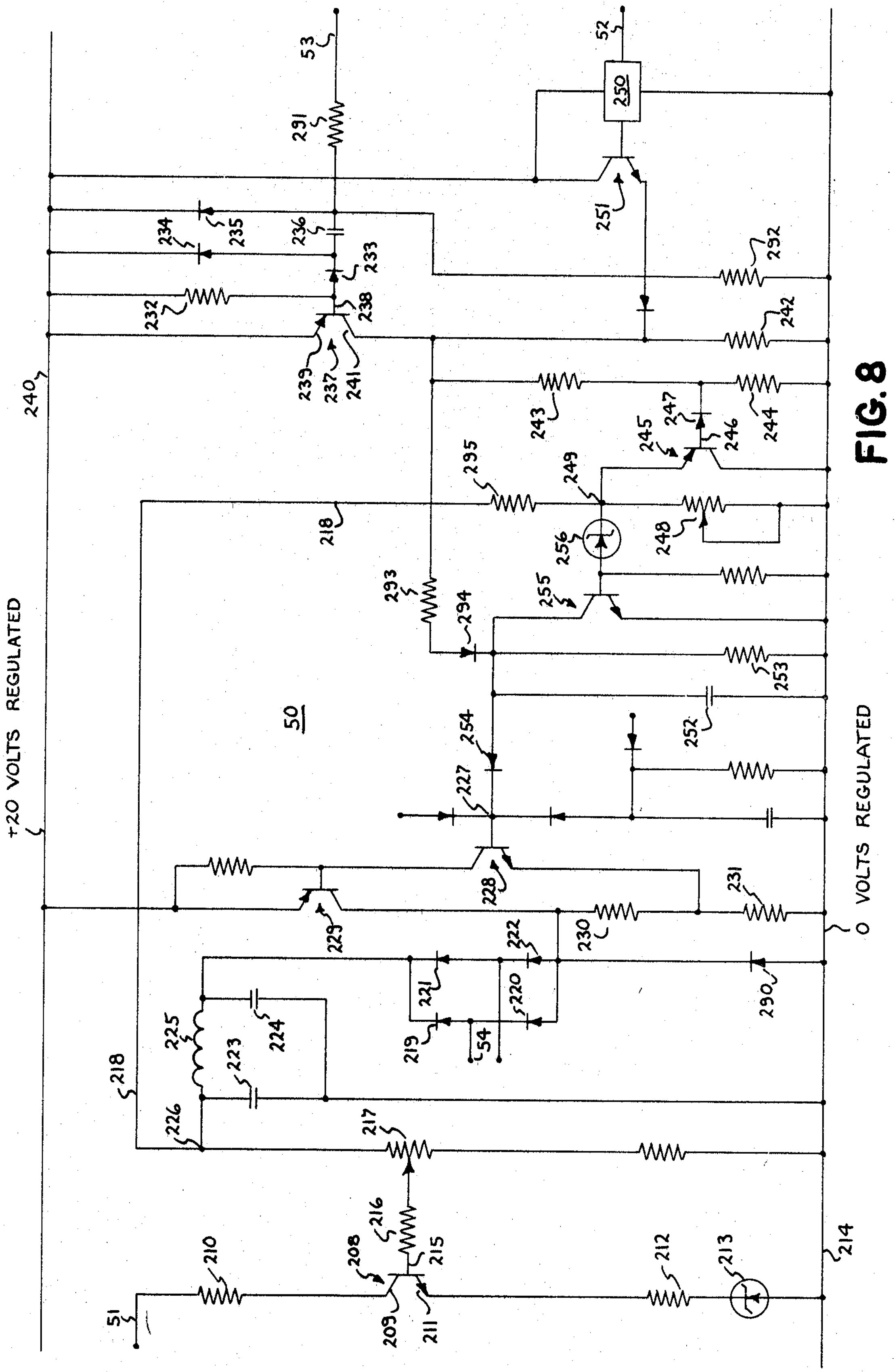
FIG. 8 illustrates an embodiment of the regulator means incorporated in the system of FIG. 3.

FIG. 8 illustrates a specific embodiment of the regulator means 50 shown in the system diagram of FIG. 3 which embodiment represents an adaptation of the regulator circuit described in detail in my copending application Ser. No. 645,747 entitled, "Motor Control System Using Current Diverter," filed June 13, 1967, and assigned to the assignee of the present invention. A regulating transistor 208 is included having a collector terminal 209 connected through a resistor 210 to output terminal 51 and an emitter terminal 211 connected through a resistor 212 and a Zener diode 213 to a source of regulated bias voltage 214. The conduction of this transistor determines the amount of current bled off from the transistor 200 included in the circuit of FIG. 7 so as to ultimately control the level of the voltage transmitted to control firing angle of the phase controlled impedance included within the controlled voltage conversion means. The transistor base 215 is connected through a resistor 216 to the arm of a potentiometer 217 which potentiometer is connected in a voltage divider circuit between a load signal line 218 and line 214. The transistor 208 compares the voltage on the load signal line 218 with a reference voltage determined by the breakdown voltage level of the Zener diode 213, and when the difference in the voltages is sufficient, the transistor 208 conducts so as to bleed off current from the transistor 200 in FIG. 7 and, hence, control the braking effort generated by the control system of this invention. The degree of conduction of transistor 208 is thus a function of the magnitude of the signal at the load line 218. This signal in turn corresponds to the summation of the voltage corresponding to the sensed drive motor characteristics and the voltage produced by certain control signals. When the sum of these voltages exceeds a predetermined nominal value, the transistor 208 conducts appropriately.

FIG. 8 illustrates input 54, the load current sensor output representative of armature current, applied to a bridge rectifier circuit comprising diodes 219 through 222. One end of the rectifier output is connected through a filter comprising series inductance 225 and bypass capacitors 223 and 224 to junction 226 of load line 218 and potentiometer 217. The other end of the rectifier output is connected serially with diode 290 to the 0-volt line 214.

As explained subsequently, the voltage across diode 290 corresponds to the magnitude of the control signal having a maximum magnitude.

FIG. 8 illustrates one input 54 for providing an indication of sensed armature current. A plurality of parallel rectifier circuits may be utilized so as to provide sensed armature current from a plurality of parallel motor circuits, such as from both load current sensors 21 and 22. In such an arrangement the sensor providing the maximum amplitude signal will establish the reference potential representative of the sensed drive motor characteristics. Similarly, parallel rectifier circuits can be employed to provide an indication of second drive motor armature voltage. Such an arrangement can be utilized for maintaining a maximum armature voltage as described in connection with the discussion relating to operating points I, II and III of FIG. 1.

A circuit comprising transistors 228 and 229 connected as amplifiers is utilized to apply control signals from the junction 227, connected to the base of transistor 228, across diode 290. Control signals indicative of maximum braking effort and other desired parameters are applied at summation point 227 in a manner similar to that described in my aforementioned co-pending application. The control signals are applied in parallel so that transistor 228 conducts in response to the control signal having the largest amplitude, resulting in amplified collector current flow of transistor 229 and thus a corresponding voltage drop across resistors 230 and 231 which are serially connected in the collector circuit and which are shunted by diode 209. Thus, the largest one of the control signals is summed with the largest one of the sensed drive motor characteristics with the resultant being applied to the load signal line 218.

The control signals, in addition to varying conduction of transistor 208 and thus varying the bleed current applied via output 51 to the voltage level means 59, additionally limit the maximum motor parameters, such as armature voltage or current. A brake limit signal applied to junction 227 will limit the maximum attainable armature current or voltage. A voltage proportional to the brake limit signal is produced across diode 290 in series with the sensed armature current signal appearing across rectifiers 219–222. When the sum of these signals equals the predetermined nominal level of the load signal line 218, the armature current and thus the braking torque cannot be increased further. The braking torque thus varies inversely with the magnitude of the braking limit signal.

The regulation circuit also includes two networks which enable it to respond properly to the presence of inputs received at terminals 52, 53 from the means 45 shown in FIG. 3 which inputs are indicative of a change in the magnitude of the braking resistance. Input terminal 53 is connected to a voltage divider comprising resistors 291 and 292. The junction of the divider is connected through a network including a biasing resistor 292, diodes 233–235, and a capacitor 236 to a transistor 237 at the base terminal 238 thereof.

The emitter terminal 239 of this transistor is connected directly to a source of positive bias voltage 240, and the collector terminal 241 is connected through a resistor 242 to the bias voltage line 214 and serially through a resistor 293 and diodes 294 and 254 to the summation point 227. When there is no input present on terminal 53, a charge exists on capacitor 236. When a pulse appears at terminal 53, diode 235 is initially forward biased to provide a discharge path for capacitor 236. After the pulse terminates, transistor 237 conducts during the recharge time so that a pulse is transmitted through resistor 293 and ultimately appears at the summation point. This, in turn, causes an increased bleed off from the transistor 200 in FIG. 7 so as to enable control by means of the regulator to be bypassed.

The collector 241 of transistor 237 is also connected to a voltage divider comprising resistors 243, 244. A transistor 245 has its emitter and collector terminals, respectively, connected to point 249 and to the bias line 214. The base terminal 246 is connected through a diode 247 to the junction point between the resistors 243, 244. A potentiometer 248 is connected across the emitter and collector terminals of transistor 245. The load signal line 218 is connected through resistor 295 to point 249. A Zener diode 256 is connected between point 249 and the base of a limiting transistor 255. A capacitor 252 and a resistor 253 are connected in parallel across the collector and emitter electrodes of transistor 255. The transistor 255 functions, briefly, to limit the increase in the voltage on the load signal line 218 caused by the conduction of transistor 237. More particularly, when transistor 237 conducts and the voltage on the collector 241 is relatively high, the voltage on the resistors 243, 244 is also relatively high so as to bias transistor 245 against conduction. This enables the base circuit of transistor 255, including Zener diode 256, to sense the voltage on the load signal line and to cause conduction of the transistor when that voltage reaches a limiting value as determined by Zener diode 256 and potentiometer 248. Conduction of transistor 255, in turn, provides a low impedance path around the capacitor 252 and resistor 253 so as to prevent further application of signals from transistor 237 to the summation point 227 when the limit is reached. When, however, transistor 237 is nonconducting, transistor 245 conducts because the potential at its base is lowered with the result that a low impedance path is created around the base circuit of transistor 255 so as to render it nonconducting.

The circuit of FIG. 8 also includes a network connected to input terminal 52 on which a signal will be applied in response to a discrete decrease in the magnitude of the braking resistance. The signal will activate a pulse generator 250 which will turn on a transistor 251 allowing current to flow and charge capacitor 252. The voltage buildup across the capacitor 252 and a resistor 253 is applied through a diode 254 to summation point 227 to further increase the voltage on the load signal line 218. The ultimate result is increased bleed off from the transistor 200 in FIG. 7 so as to enhance the required instantaneous reduction in the output of the controlled voltage conversion means in response to such a change in the breaking resistance. The transistor 255 and breakdown diode 256 again function to limit the amount of voltage buildup across the capacitor 252 and resistor 253.

Figure 9:
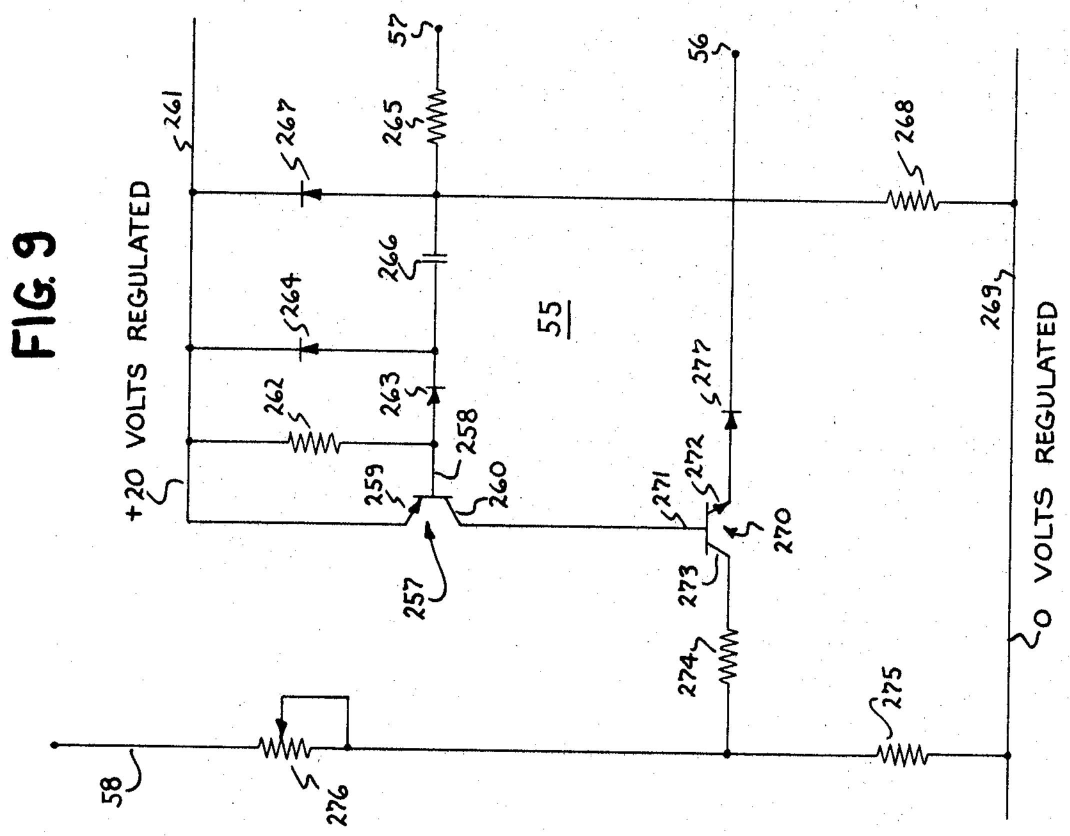
FIG. 9 shows a specific embodiment of the command circuit included in the system of FIG. 3.

FIG. 9 reveals a specific embodiment of the command circuit 55 shown in the system diagram of FIG. 3. A first semiconductor switch comprising PNP transistor 257 having base 258, emitter 259, and collector 260 terminals is connected so as to be responsive to the presence of an input signal at terminal 57 indicative of a discrete change in the magnitude of the braking resistance. In particular, the emitter terminal 259 of transistor 257 is connected to a positive bias voltage line 261 and the control or base terminal 258 is connected through a resistor 262 to the bias voltage line 261. The base terminal is also connected to the anode of a first diode 263, the cathode of which is connected to the anode of a second diode 264, the cathode of which is connected to the bias voltage line 261. The point common to the cathode of the first diode 263 and the anode of the second diode 264 is connected to one terminal of a capacitor 266, the other terminal of which is connected through a resistor 265 to input terminal 57. This latter terminal of capacitor 266 is connected to the junction of a third diode 267 and a resistor 268 which are connected in series from the positive bias voltage line 261 to a line 269 on which there is provided a lower bias voltage.

A second semiconductor switch in the form of NPN transistor 270 having base 271, emitter 272, and collector 273 terminals is connected so as to transmit the voltage input from the brake resistor voltage sensing means 19, 20, included in the power circuit of FIG. 2 to the command circuit output terminal 56 when the first semiconductor switch 257 is conducting. In particular, the collector terminal 273 of transistor 270 is connected through a resistor 274 to the junction of a voltage divider comprising resistor 275 and variable resistor 276. The variable resistor 276 is connected to the input terminal 58. The base terminal 271 is connected to the collector terminal 260 of transistor 257 and the emitter 272 of transistor 270 is connected through a diode 277 to the output terminal 56 of the command circuit. If the increments of the braking resistances included in the power circuit of FIG. 2 are of different rather than equal magnitudes, there will be included additional voltage dividers suitably connected between the inputs to the command circuit and the collector terminal of transistor 270.

In operation, a pulse appearing at input terminal 57 will discharge the capacitor 266, and when the pulse disappears, the capacitor will recharge through the resistor 268 resulting in the conduction of transistor 257 for a time determined by the time constant of the capacitor 266 and resistor 268. The conduction of transistor 257 results in the turning on of transistor 270 which transmits the voltage signal obtained from the divider comprising resistors 275, 276, which signal is indicative of the voltage on the braking resistance, to output terminal 56 and thus to the input 62 of the variable voltage level providing means 59 shown in FIG. 3. The capacitor 266 and resistor 268 should be of a magnitude so that transistor 270 remains on for a time necessary for the resistor and capacitor included in the filter of the variable voltage level providing means to charge up to the proper value.

Figure 9A:
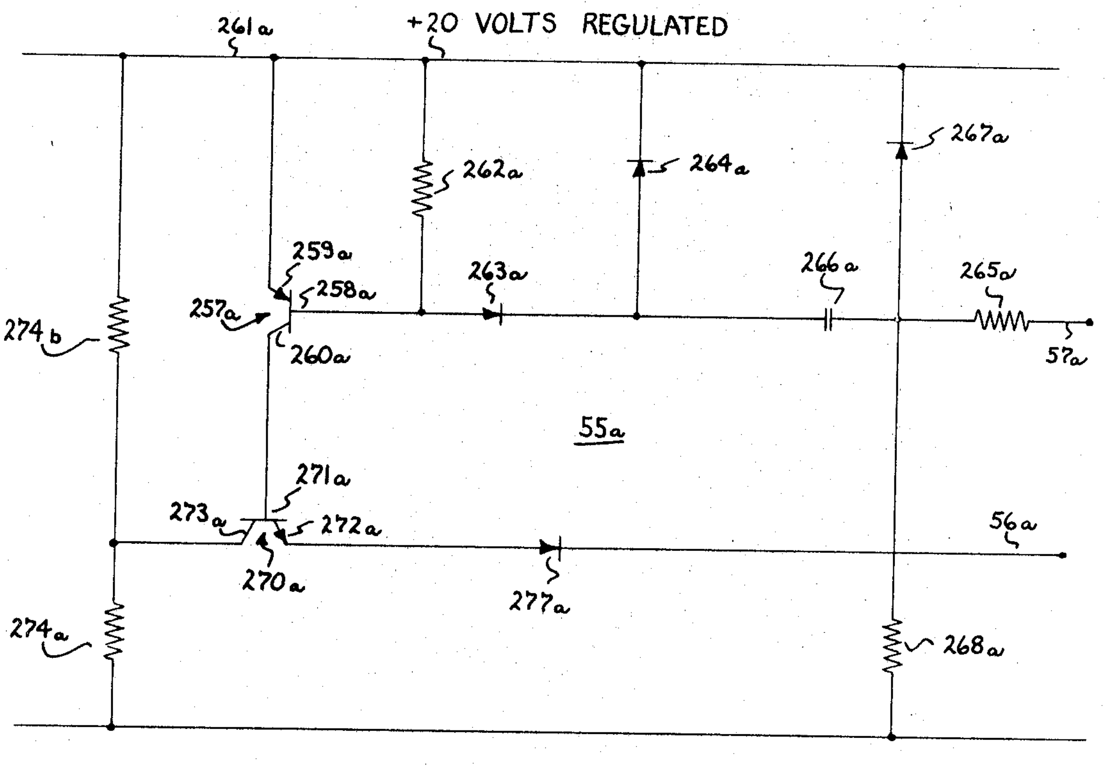

FIG. 9*a* shows an embodiment of the pulse generator **55*a*, shown in FIG. 3. It is constructed in a manner similar to the command circuit 55 and functions to provide an output pulse of a predetermined duration at output terminal 56*a* upon the disappearance of a pulse on input terminal 57*a*. A pulse appearing at input terminal 57*a* will discharge the capacitor 266*a*, and when the pulse disappears the capacitor will recharge through the resistor 268*a* resulting in the turning on of the first semiconductor switch or transistor 257*a* for a time determined by the time constant of the capacitor 266*a* and resistor 268*a*. The conduction of transistor 257*a* results in the turning on of a second semiconductor switch or transistor 270*a* which functions to transmit the positive voltage drop on resistor 274*a* to output terminal 56*a* and thus to the input terminal 61 of the variable voltage level providing means 59 shown in FIG. 3. The capacitor 266*a* and resistor 268*a*** should be of a sufficient magnitude as specified in the discussion of FIG. 9.

Figure 10:
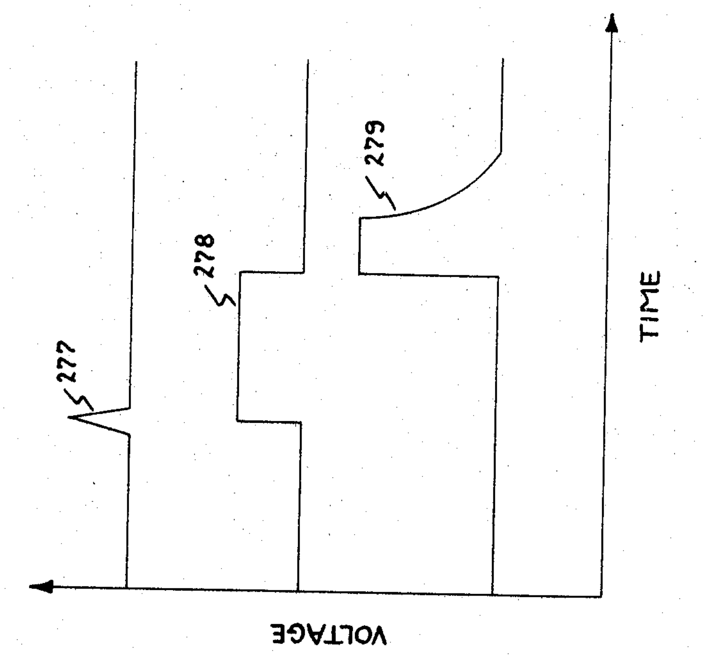
FIG. 10 illustrates waveforms occurring at certain parts of the system of FIG. 3.

A more complete understanding of the operation of the command circuit in cooperation with other elements of the control system may be seen by referring to the waveforms illustrated in FIG. 10. When the system is operating in the braking mode and when the output of the controlled voltage conversion means has been reduced to zero, the second pulse producing means 40 included within the system of FIG. 3 will provide a short duration pulse represented by waveform 277 in FIG. 10 which is applied to input terminal 47 of the means 45 in FIG. 3. The means 45 generates a pulse, represented by waveform 278 in FIG. 10, having a duration equal to the time delay between the commanded and actual opening of one of the contactors included within the power circuit of FIG. 2. In dynamic braking systems to which this invention is applicable, such a time delay would be of the order of one-tenth to one-half of a second. This pulse 278 appears at output terminal 49 of the means 45 and is applied to input terminal 57 of the command circuit 55 of FIG. 3. Referring to the specific embodiment of FIG. 9, it will be observed that the capacitor 266 will be discharged for the duration of the pulse 278. At the instant which the pulse 278 disappears, corresponding to the time at which the contactor in the power circuit has completely opened, the capacitor 266 will recharge allowing transistor 257 in the circuit of FIG. 9 to conduct and turn on transistor 270 for a time determined by the magnitude of the time constant of capacitor 266 and resistor 268. For this duration of time, the transistor 270 allows the voltage proportionate to that on input terminal 58, which corresponds to the voltage on the braking resistance, to be applied through output terminal 56 to input terminal 62 of the voltage level providing means 59. The result is that the voltage at point 192 and hence the voltage at output terminal 60 of the circuit shown in FIG. 7 will be sharply and relatively instantaneously increased to a new pedestal height. This new pedestal height is accomplished during the time of the waveform 279 in FIG. 10. The duration of time at which the pedestal height remains at this newly increased level is equal to the time at which the transistor 270 included within FIG. 9 is turned on. When the transistor 270 is turned off, that is, when the capacitor 266 has completely recharged and the transistor 257 is therefore turned off, the voltage at point 192 will again be under control of the regulator means 50. It again operates to control the amount of current bled off from transistor 200 in FIG. 7 which regulator means will proceed to slowly reduce the pedestal height as required by the means 50.

In a similar manner, when the output of the controlled voltage conversion means exceeds the measured voltage on the braking resistance, the first pulse producing means 36 in the system of FIG. 3 will provide a pulse as represented by waveform 277 in FIG. 10. The means 45 will generate a pulse represented by waveform 278 having a duration equal to the time delay between the commanded and actual closing of one of the contactors. This pulse is applied to input terminal **57*a* of the pulse generator 55*a*, and when pulse 278 disappears, a pulse as shown by waveform 279 appears at output terminal 56*a*. The application of this pulse to input terminal 61 of the means 59 shown in FIG. 3 results in a decrease in the firing angle of the phase controlled impedance in the conversion means 23 for a time equal to the duration of the pulse 279** as previously explained.

FIG. 11 illustrates waveforms which represent the result of the operation of the control system contemplated by this invention in conjunction with the controlled voltage conversion means to regulate the braking current during both increased and decreased braking and at high and low speeds. The braking current over a period of time in which the braking effort is both increased and decreased is represented by waveform 280. The ascending portion of the waveform shows the gradual increase in the current up to a desired level indicated by the horizontal portion 281 of the curve. Each of the notches, such as that corresponding to 282, indicates a slight discontinuity in the current when one of the increments of the braking resistance is shorted out. At a low speed to which this waveform corresponds, such as 1500 r.p.m., it has been found that the time necessary to reach the desired level of braking current is approximately 1.5 seconds. The descending portion 283 of the curve 280 represents the braking current at low speed when reduced braking effort is desired. Each of the short horizontal portions, such as that designated 284, is indicative of the effect on the braking current when a discrete increment of braking resistance is added.

The waveform 285 represents the braking current characteristics at a speed much higher than that represented by the waveform 280. The ascending portion of the curve 285 likewise is indicative of the functioning of the control system of FIG. 3 to increase the braking effort up to a desired level indicated by the horizontal portion 287 of the curve. Each of the notches such as that designated 286 corresponds to the slight effect on the braking current when one increment of the braking resistance is shorted out. The descending portion 288 similarly shows the current characteristic when reduced braking effort is desired, and each of the horizontal portions, such as 289, shows the slight discontinuity on the braking current arising when an increment of braking resistance is added. At this much higher speed, the time required for the system to attain a maximum braking effort is, of course, somewhat longer than that necessary at the speed corresponding to the waveform 280.

In some situations it is contemplated that the output of the controlled voltage conversion means will be limited so as to preclude the addition of successively larger amounts of voltage in moving, for example, from operating point I to point III across the characteristic curves of FIG. 1. The system may be modified, therefore, without departing from the scope of this invention, so as to provide the controlled successive addition of voltage during the movement between two operating points, such as those previously mentioned, up to an intermediate point at which the controlled voltage conversion means is providing its maximum output, and thereafter to return voltage to the source in controlled successively smaller amounts for the remainder of the movement.

FIG. 12 reveals a modified version of the power circuit of FIG. 2 whereby the aforementioned may be accomplished. In addition to all of the components included in the circuit of FIG. 2, it includes a first switch 300 with contacts 301 and 302 and a second switch 303 with contacts 304 and 305. In addition, a phase controlled impedance 306 having a control terminal 307 and input and output terminals 309 and 308, respectively, is included. Input terminal 309 is connected to contact 304 and output terminal 308 is connected through line 310 to the rectifier **28*a*. Contact 302 of switch 300 is connected through line 311 to a center tap connection 312 on the transformer secondary winding. Parts of phase control means 24*a* and the added means 306** will thus comprise a conventional phase controlled control connection capable of conversion and inversion. By phase control, therefore, voltage may be inserted to augment or oppose that of the series generators.

The operation of the circuit of FIG. 12 can be most easily understood by referring to the characteristics of FIG. 1 and assuming a movement of the operating point to the right between operating points I and III. At the outset, switch 300 is connected to contact 301 and switch 303 to contact 305. The operation will be identical with that of the original circuit of FIG. 2, that is, controlled amounts of voltage will be added from the source to the motor and braking resistance so as to cause a movement of the operating point to the right across the curves.

Assume further that when an intermediate point, such as III, is reached, the controlled voltage conversion means **23*a* is providing its maximum output. An indication of this would be provided by suitable means and this indication utilized to activate switches 300 and 303 to engage contacts 302 and 304. This indication would also be utilized to send a pulse to the means 45 in the control system of FIG. 3 to reduce the braking resistance by one increment. The phase controlled impedances 306 and 24*a*** would then operate, under a suitable control, to return power back to the source against successively smaller amounts of source voltage. A further movement to the right would result and when operation point III is reached, the cycle of operation would be repeated.

It is felt that the teachings in connection with the control system of FIG. 3 and the specific embodiments thereof are sufficient to enable modification of the system in accordance with this discussion without departing from the scope of the invention. The pulse producing means 40 generates an output when the conversion means 23 output is zero and could thus be modified to provide an output when the conversion means reaches a known maximum negative or inverting output. The phase controlled impedance 306 and **24*a* would be under control of the regulator means 50** so as to have a maximum to zero range of firing angles.

A problem associated with the arrangement of FIG. 12 is that the use of switches, such as 300, will cause a momentary interruption of the motor current of a duration equal to the time in mechanical movement of the switch. An alternative embodiment would operate solely with phase control of the means **24*a* and 306 and hence obviate the need for operation of the switches except at the initial circuit establishment and therefore eliminate the switching problems associated therewith. More particularly, the means 24*a* and 306** would be controlled to conduct in separate ninety degree portions of the cycle of supply current as the system operating point requires conversion or inversion. The sequence of operations will, however, be somewhat different from that of the arrangement of FIG. 12 as can be seen by an inspection of the characteristic curves presented in FIG. 13. The curves are similar to those presented in FIG. 1 with the exception that the resistance load lines R1'–R4' have been shifted to the right.

In operation, the phase controlled impedance 24*a* and 306 are turned on during the first ninety degrees of the supply cycle to take the system to operating point I'. The firing angle is varied from 90° advance to maximum. At this point phase controlled impedance 24*a* and 306 are varied from 90° advance to zero as the operating point is moved from I' to II'. Power is returned to the source in an amount determined by the voltage required as indicated by the vertical distance between the curve ML' and the load line R4'. When the system reaches operating point II', the controlled impedance 24*a* and 306 will be operating at ninety degrees phase advance of the cycle. For further movement of the operating point toward III' phase advance will progress beyond 90° advance and thus successively larger amounts of voltage will be added from the source to the motor and braking resistance in an amount determined by the vertical distance between the R4' load line and the curve ML'. The system operating point will hence move further to the right. Operating point III' designates the point at which the firing angle of the phase controlled impedance 24*a* and 306 is nearing a desired maximum. At this point, the control system will function to decrease the magnitude of the braking resistance by one increment so that operation will be on the R3' load line, and to retard the firing of the controlled impedance 24*a* and 306 to an appropriate retarded firing angle. The controlled impedance will then be inverting and will return successively smaller amounts of voltage, as determined by the vertical distance between the curve ML' and the load line R3', from the motor and braking resistance to the source with the result that the system operating point moves further to the right. When operating point IV is reached, controlled impedance 24*a* and 306 is again operating at 90° advance and progresses for a similar series of operations. This continues until the desired level of braking current is reached.

A similar sequence of operations will occur when reduced braking current is desired. The movement of the operating point will be to the left across the characteristics of FIG. 13, and between resistance load lines the phase controlled impedance 24*a* and 306 will operate from maximum to zero firing angle for approximate voltage output.

It is likewise felt that the teachings in connection with the control system of FIG. 3 and the specific embodiments thereof are sufficient to enable modification of the system in accordance with this discussion without departing from the scope of the invention. During the mode of operation where braking effort is to be increased, control of the impedances 24*a* and 306 would be by the regulator means 50 in conjunction with the voltage level providing means 59. At the time in the cycle corresponding to maximum forward output means 32 can conveniently be utilized to initiate decrease in the magnitude of the braking resistance as before. During the mode of operation when braking effort is to be reduced, the output of the voltage level providing means can again be utilized since the firing angle of the phase controlled impedance is varied from advanced to full regard. The magnitude of the braking resistance will be increased in response to an indication that the output of the phase controlled impedance is at maximum inversion.

As the system operating point is moved either to the left or to the right between any two resistance load lines, power will be both added from the source to the load and returned from the load to the source. If the operation is symmetrical, the net power consumption will thus be zero. If the operation is not symmetrical, the net power consumption will be made low or negative. The ability of this system to operate with a considerably low, zero or regenerative net power is an obviously significant advantage.

While the invention has been described with specificity, it is the aim of the appended claims to cover all such variations as come within the spirit of the foregoing disclosure.

What I claim as new and desire to secure by Letters Patent of the United States are:

1. A dynamic braking circuit for D-C motor means having serially connected armature and field circuits, comprising:

(a) a braking resistance having discrete increments of resistance;

(b) controlled voltage conversion means having an input adapted to be connected to a source of alternating current and having a conversion means output of variable D-C voltage;

(c) said braking resistance and motor means being connected in series circuit to said conversion means output;

(d) a regulator responsive to at least sensed motor armature current and having an output for providing a signal to control said conversion means;

(e) pulse producing means for generating pulses responsive to desired voltage levels of said conversion means output;

(f) resistance actuation means for changing the magnitude of said braking resistance by discrete increments in response to the application of said pulses.

2. The circuit recited in claim 1, further comprising means responsive to a discrete change in the magnitude of said braking resistance for changing the output of said controlled conversion means during a predetermined time interval to compensate for a change in voltage across said braking resistance which would otherwise result from such discrete change.

3. The circuit recited in claim 1 wherein said pulse producing means comprises:

(a) a first pulse producing means for generating a first pulse responsive to said source voltage increasing to a predetermined level in respect to the voltage across an increment of braking resistance, and (b) a second pulse producing means for generating a second pulse responsive to said source voltage decreasing to a predetermined level.

4. The circuit recited in claim 3 wherein said resistance actuation means comprises means responsive to the occurrence of said first pulse for removing an increment of braking resistance and responsive to the occurrence of said second pulse for adding an increment of braking resistance.

5. The circuit recited in claim 4 further comprising:

(a) a first voltage sensor responsive to the conversion means output;

(b) a second sensor responsive to voltage across an increment of braking resistance;

(c) said first pulse producing means having first and second inputs connected respectively to said first and second voltage sensors, and (d) said second pulse producing means having an input connected to said second voltage sensor.

6. The circuit recited in claim 4 further characterized by:

(a) a pulse generator for generating a third pulse commencing concurrently with the removal of an increment of braking resistance;

(b) a command circuit for generating a fourth pulse commencing concurrently with the addition of an increment of braking resistance; and (c) voltage level means having first, second, and third inputs connected respectively to the output of said regulator, to said pulse generator and to said command circuit, said voltage level means having an output coupled to said controlled conversion means to control the conversion means output voltage, said voltage level means in the absence of said third and fourth pulse providing an output responsive to the output of said regulator, in the presence of a third pulse providing an output for a predetermined brief time of predetermined magnitude, and in the presence of a fourth pulse providing an output for a predetermined brief time having a magnitude responsive to the voltage across an increment of braking resistance.

7. The circuit recited in claim 5 wherein said resistance activation means further comprises:

(a) first and second inputs connected respectively to said first and second pulse producing means;

(b) first and second outputs;

(c) means for providing a pulse at said first output initiating substantially concurrently with the application of said first pulse from said first pulse producing means and terminating substantially concurrently with the actual removal of an increment of braking resistance; and (d) means for providing a pulse output at said second output initiating substantially concurrently with the application of said second pulse from said second pulse producing means and terminating substantially concurrently with the actual addition of an increment of braking resistance.

8. The circuit recited in claim 7 further comprising:

(a) a pulse generator comprising an output and an input connected to the first output of said resistance activation means, said pulse generator being responsive to a pulse applied at said input to provide at the output of said pulse generator a third pulse of predetermined short duration commencing substantially with the termination of the pulse applied at the input of said pulse generator;

(b) a command circuit comprising an output, and an input connected to the second output of said resistance actuation means, said command circuit being responsive to a pulse applied at said input to provide at the output of said command circuit a fourth pulse of predetermined short duration commencing substantially with the termination of the pulse applied at the input of said command circuit; and (c) voltage level means having first, second and third inputs connected, respectively, to the outputs of said regulator, pulse generator and command circuit, and an output coupled to said controlled conversion means to control the conversion means output voltage, said voltage level means in the absence of said third and fourth pulse providing an output responsive to the output of said regulator, in response to the application of a third pulse providing an output of predetermined magnitude, and in response to the application of a fourth pulse providing for a short time an output of a magnitude responsive to the voltage across an increment of braking resistance.

9. The circuit recited in claim 8 wherein said command circuit further comprises a second input terminal coupled to said second sensor responsive to voltage across an increment of braking resistance, and means for providing at the output of said command circuit a fourth pulse having a magnitude responsive to the signal of said sensor.

10. A dynamic braking circuit for D-C motor means having serially connected armature and field circuits, comprising:

(a) a braking resistance having discrete increments of resistance and said motor means connected in series circuit;

(b) a source of controlled D-C output voltage connected across said serially connected braking resistance and motor means;

(c) control means connected to said source to vary the source voltage in response to predetermined electrical parameters of said series circuit; and (d) switching means for changing the magnitude of said braking resistance in discrete increments responsive to the magnitude of said source voltage.

11. The circuit recited in claim 10 wherein said switching means comprises:

(a) first circuit means adapted to decrease the magnitude of said braking resistance by a discrete increment of said braking resistance in response to said source voltage increasing to a predetermined level with respect to the voltage across the increment of resistance to be shunted; and (b) second circuit means adapted to increase the magnitude of said braking resistance by a discrete increment in response to said source voltage decreasing to a predetermined level.

12. The circuit recited in claim 10 wherein said control means comprises:

(a) first control means responsive to preselected electrical parameters of said motor means for gradually adjusting the output voltage of said source; and (b) second means responsive to a discrete change in the magnitude of said braking resistance to change the output voltage of said source during a brief time interval to a magnitude compensating for the instantaneous change of voltage across said braking resistor otherwise resulting from the change of braking resistance.

13. The circuit recited in claim 10 wherein said switching means comprises:

(a) a first sensor responsive to voltage across a brake resistance increment;

(b) a second sensor responsive to source voltage;

(c) first pulse producing means having first and second input terminals connected to said first and second sensors and an output terminal adapted to provide a pulse in response to a predetermined relationship between the voltage output of said conversion means and the voltage on said braking resistance increment;

(d) second pulse producing means having an input connected to said second sensor and an output terminal adapted to provide a pulse when the voltage output of said conversion means reaches a predetermined level; and (e) resistance actuation means having first and second input terminals connected respectively to said output terminals of said first and second pulse producing means, said resistance actuation means being adapted to shunt an increment of braking resistance in response to the application of a pulse to said first input and to remove a shunt from an increment of braking resistance in response to the application of a pulse to said second input.

14. The circuit recited in claim 13 wherein said resistance actuation means is adapted to sequentially shunt successive increments of braking resistance in response to the application of successive pulses to said first input and to sequentially remove shunts from successive increments of braking resistance in response to the application of successive pulses to said second input.

References Cited

UNITED STATES PATENTS

| | | | |
|---|---|---|---|
| 2,128,034 | 8/1938 | Austin et al. | 318—367 |
| 2,565,118 | 8/1951 | Binney et al. | 318—367 |
| 2,757,328 | 7/1956 | Willby et al. | 318—378 |
| 3,034,031 | 5/1962 | Lichtenfels | 318—380 |
| 3,218,537 | 11/1965 | Stamm | 318—380 |
| 3,249,841 | 5/1966 | Liebenthal | 318—367 |
| 3,457,487 | 7/1969 | Cooper | 318—381 |

ORIS L. RADER, Primary Examiner

K. L. CROSSON, Assistant Examiner

U.S. Cl. X.R.

318—377, 380